(12) United States Patent
Sole et al.

(10) Patent No.: US 10,931,680 B1
(45) Date of Patent: Feb. 23, 2021

(54) ACCESS PROXY PLATFORM

(71) Applicant: Fyde, Inc., Palo Alto, CA (US)

(72) Inventors: Pablo German Sole, Woodside, CA (US); Jose Luis Ferras Pereira, San Mateo, CA (US); Sinan Eren, Woodside, CA (US); Luisa Marina Moya Praca de Araujo Lima, Oporto (PT)

(73) Assignee: Fyde, Inc., Palo Alto, CA (US)

( * ) Notice: Subject to any disclaimer, the term of this patent is extended or adjusted under 35 U.S.C. 154(b) by 51 days.

(21) Appl. No.: 16/751,183

(22) Filed: Jan. 23, 2020

Related U.S. Application Data

(60) Provisional application No. 62/796,490, filed on Jan. 24, 2019, provisional application No. 62/804,645, filed on Feb. 12, 2019.

(51) Int. Cl.
*H04L 29/06* (2006.01)

(52) U.S. Cl.
CPC ........ *H04L 63/105* (2013.01); *H04L 63/0272* (2013.01); *H04L 63/0281* (2013.01); *H04L 63/0853* (2013.01); *H04L 63/107* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 2002/0161904 A1* | 10/2002 | Tredoux | H04L 67/2814 709/229 |
| 2006/0015722 A1 | 1/2006 | Rowan | |
| 2006/0031407 A1* | 2/2006 | Dispensa | H04L 61/25 709/219 |
| 2007/0199060 A1 | 8/2007 | Touboul | |
| 2008/0127311 A1 | 5/2008 | Yasaki | |
| 2008/0146211 A1 | 6/2008 | Mikan | |
| 2008/0313728 A1* | 12/2008 | Pandrangi | H04L 63/083 726/12 |
| 2010/0154055 A1 | 6/2010 | Hansen | |
| 2011/0231900 A1* | 9/2011 | Shimoe | G06F 21/604 726/1 |
| 2012/0240185 A1 | 9/2012 | Kapoor | |
| 2012/0311697 A1 | 12/2012 | Swingler | |
| 2013/0159021 A1* | 6/2013 | Felsher | G06F 21/6245 705/3 |
| 2013/0227636 A1 | 8/2013 | Bettini | |
| 2015/0281258 A1 | 10/2015 | Watkins | |

(Continued)

OTHER PUBLICATIONS

Amble et al., Ordered Hash Tables, The Computer Journal, Jun. 1973, pp. 135-142, vol. 17, No. 2.

(Continued)

*Primary Examiner* — Shin-Hon (Eric) Chen
(74) *Attorney, Agent, or Firm* — Van Pelt, Yi & James LLP

(57) ABSTRACT

An access proxy system is disclosed. A proxy server receives, from a client device, a request to access a protected resource. The protected resource represents a mapping between a user-facing domain and an internal domain that is only accessible from behind a set of one or more proxies that includes the proxy server. In response to receiving a grant of permission by an access policy engine, the proxy server proxies access to the protected resource using a mutual-TLS connection with the client device.

16 Claims, 29 Drawing Sheets

(56) References Cited

U.S. PATENT DOCUMENTS

| | | | |
|---|---|---|---|
| 2016/0088022 A1* | 3/2016 | Handa | H04L 67/2823 |
| | | | 726/1 |
| 2016/0241665 A1 | 8/2016 | Covell | |
| 2016/0255505 A1 | 9/2016 | Oberheide | |
| 2017/0310703 A1 | 10/2017 | Ackerman | |
| 2017/0331858 A1 | 11/2017 | Clark, III | |
| 2018/0115551 A1* | 4/2018 | Cole | H04L 41/0893 |
| 2018/0137296 A1* | 5/2018 | Cahana | G06F 21/629 |
| 2018/0191680 A1 | 7/2018 | Ahuja | |
| 2019/0109864 A1 | 4/2019 | Eren | |

OTHER PUBLICATIONS

Author Unknown, A Better Compressed Bitset, Roaring Bitmaps, 2017.
Author Unknown, Creating SCIM Connectors, Okta, Jun. 22, 2018.
Author Unknown, C-SPIFFE, GitHub, Dec. 7, 2018.
Author Unknown, Design Document: SPIFFE Reference Implementation (SRI), Aug. 2, 2017.
Author Unknown, Ghostunnel, GitHub, Sep. 27, 2017.
Author Unknown, Go SPIFFE, GitHub, Nov. 27, 2019.
Author Unknown, NSURLIsExcludedFromBackupKey, Apple Developer Documentation, 2019.
Author Unknown, SCIM: Provisioning with Okta Lifecycle Management, Okta Developer, 2019.
Author Unknown, Secure Enclave Crypto, GitHub, Dec. 21, 2016.
Author Unknown, Security, Vanadium, 2019.
Author Unknown, SPIFFE-Helper, GitHub, Oct. 8, 2019.
Author Unknown, SPIFFE-Nginx, GitHub, Oct. 9, 2018.
Author Unknown, Spire, GitHub, Jan. 22, 2020.
Author Unknown, Storing Keys in the Secure Enclave, Apple Developer Documentation, 2019.
Author Unknown, The X.509 SPIFFE Verifiable Identity Document, Github, Sep. 4, 2019.
Barnes et al., Automatic Certificate Management Environment (ACME), Jun. 21, 2017.
Brown et al., Transport Layer Security (TLS) Authorization Extensions, May 2010.
Cahill et al., Assertions and Protocols for the OASIS Security Assertion Markup Language (SAML) V2.0, OASIS Standard, Mar. 15, 2005.
Carpenter et al., A Reference Model for Autonomic Networking, Feb. 23, 2018.
Cittadini et al., BeyondCorp Part III: The Access Proxy, ;login:, 2016, pp. 28-33, vol. 41, No. 4.
Farrell et al., An Internet Attribute Certificate Profile for Authorization, Jan. 2010.
Ghali et al., Application Layer Transport Security, Google Cloud, Dec. 2017.
Ian Haken, Secrets at Scale Automated Bootstrapping of Secrets and Identity in the Cloud, Enigma, Jan. 30, 2017.
Josang et al., Trust Transitivity and Conditional Belief Reasoning, IFIPTM, 2012, pp. 68-83.
Matt Klein, Service Mesh Data Plane vs. Control Plane, Envoy Proxy, Oct. 10, 2017.
Nir et al., Considerations for Using Short Term Certificates, Mar. 5, 2018.
Prabath Siriwardena, Short-Lived Certificates @ Netflix, Medium, May 10, 2016.
Richters et al., Trust Transitivity in Social Networks, PLoS ONE, Apr. 5, 2011.
Thompson et al., Certificate-Based Authorization Policy in a PKI Environment, 2001.
Topalovic et al., Towards Short-Lived Certificates, 2012.
Abdullah Alshalan, Sandeep Pisharody, and Dijiang Huang. "A survey of mobile VPN technologies." IEEE Communications Surveys & Tutorials 18, No. 2 (2016): 1177-1196.
Anh Le, Janus Varmarken, Simon Langhoff, Anastasia Shuba, Minas Gjoka, and Athina Markopoulou. "AntMonitor: A system for monitoring from mobile devices." In Proceedings of the 2015 ACM SIGCOMM Workshop on Crowdsourcing and Crowdsharing of Big (Internet) Data, pp. 15-20. ACM, 2015.

* cited by examiner

●●●●○ T-Mobile LTE 1:19 PM 57% 🔋

< ▷ 🗀 ⋮

------- Forwarded message -------
From: Airbnb <express@ssl1-airnb.com>
Date: Sun, Apr 30, 2017 at 10:07 AM
Subject: Congratulation For
Your Airbnb Booking: Exclusive Villa Dubrovnik
To: < ▌@gmail.com>

Ⓐ airbnb

Itinerary for Exclusive Villa Dubrovnik

Confirmation Code: ▬▬▬

Guest details: ▬▬▬▬▬

●●●●○ T-Mobile LTE 1:19 PM 57% 🔋

< ▷ 🗀 ⋮ now we are experience some issue with our credit/debit card gateway payment system right now in order to avoid a decline of your reservation we advise you to submit the payment to our bank account provided below. For your booking the payment method is Bank-to-Bank Wire Transfer, also know as bank transfer. The payment is held by Airbnb and will be released to the host after the guest checks in confirm that everything is as described.

Using Airbnb's payment system is required to make a reservation, and it helps ensure that both parties are protected under our Terms of Service, cancellation policies, Guest Refund Policy, and other safeguards.
Paying outside the Airbnb system is not secure, and we cannot provide access to these benefits when reservations aren't booked directly through Airbnb.

Bank Name   ZABA BANK
Bank Address Josipa Jelacica 10, Zagreb Croatia

Account
Beneficiary   AIRBNB G B LTD

*FIG. 7B*

Dear Apple Customer,

An iPhone registered to your account has been located. Sign in with your Apple ID to view it's current location:

https://îcloud.com/FindMyiPhone/

Apple Support
https://support.apple.com/.

*FIG. 7E*

```
Certificate:
    Data:
        Version: 3 (0x2)
        Serial Number:
            7c:48:65:28:1c:b5:c1:16:92:fc:74:a1:b4:2c:42:88:a4:0f:c9:1a
    Signature Algorithm: ecdsa-with-SHA256
        Issuer: CN=Fyde Root Certificate Authority
        Validity
            Not Before: Nov 17 19:15:00 2018 GMT
            Not After : Nov 16 19:15:00 2023 GMT
        Subject: CN=Fyde Root Certificate Authority
        Subject Public Key Info:
            Public Key Algorithm: id-ecPublicKey
                Public-Key: (256 bit)
                pub:
                    04:55:fd:b1:9d:3a:66:87:56:3e:1c:c5:36:df:41:
                    3a:e5:3f:d1:27:26:a7:2d:21:dd:e6:23:fa:3b:15:
                    06:8c:9f:36:8d:63:ce:f3:fb:e0:58:bd:3d:fd:a3:
                    0f:5d:d8:d4:20:9f:12:ff:3b:66:59:93:7e:4a:22:
                    ab:34:4b:f1:53
                ASN1 OID: prime256v1
                NIST CURVE: P-256
        X509v3 extensions:
            X509v3 Key Usage: critical
                Certificate Sign, CRL Sign
            X509v3 Basic Constraints: critical
                CA:TRUE, pathlen:2
            X509v3 Subject Key Identifier:
                0A:63:45:16:F5:3B:54:8D:37:BC:6E:54:F8:A2:AC:03:E3:D1:F0:99
    Signature Algorithm: ecdsa-with-SHA256
         30:44:02:20:1e:2b:b8:60:00:04:e8:85:65:ab:22:21:6b:5f:
         62:aa:00:b7:26:5d:86:27:d0:14:93:97:79:c0:ad:a9:69:9e:
         02:20:2a:70:5f:c7:c6:1e:f2:a3:af:aa:8f:48:f6:65:4c:3e:
         2a:22:14:30:7c:d8:73:a8:aa:e7:f2:dc:e2:22:c7:0c
```

*FIG. 11*

```
Certificate:
    Data:
        Version: 3 (0x2)
        Serial Number:
            14:3a:3d:85:d2:cd:79:12:41:a2:c2:01:ce:c5:31:67:5b:a8:d4:f4
    Signature Algorithm: ecdsa-with-SHA256
        Issuer: CN=Fyde Root Certificate Authority
        Validity
            Not Before: Nov 17 19:19:00 2018 GMT
            Not After : Nov 16 19:19:00 2021 GMT
        Subject: CN=Fyde Intermediary Certificate Authority
        Subject Public Key Info:
            Public Key Algorithm: id-ecPublicKey
                Public-Key: (256 bit)
                pub:
                    04:e9:fb:bd:42:4b:c0:94:79:3e:08:8d:d6:84:0a:
                    c7:98:cf:b6:2f:78:b8:51:33:ad:22:e5:8e:6e:05:
                    b1:71:da:ff:e6:38:60:80:3b:27:90:17:40:c2:67:
                    6f:f8:b9:74:3e:eb:25:58:ba:a0:cc:28:e3:cf:3a:
                    f1:28:f9:cc:61
                ASN1 OID: prime256v1
                NIST CURVE: P-256
        X509v3 extensions:
            X509v3 Key Usage: critical
                Certificate Sign, CRL Sign
            X509v3 Basic Constraints: critical
                CA:TRUE, pathlen:1
            X509v3 Subject Key Identifier:
                BA:7F:C0:B2:15:67:50:EE:EC:35:C9:61:81:88:CD:A8:51:30:C8:DB
            X509v3 Authority Key Identifier:
                keyid:0A:63:45:16:F5:3B:54:8D:37:BC:6E:54:F8:A2:AC:03:E3:D1:F0:99

Signature Algorithm: ecdsa-with-SHA256
         30:45:02:21:00:82:60:98:b3:ab:f1:d7:df:4b:f0:19:99:3f:
         21:56:1b:14:44:b3:b1:b9:77:70:1b:07:05:d1:84:4d:dd:0c:
         16:02:20:23:54:88:0e:0b:4f:75:72:ef:77:16:00:08:93:4c:
         87:f0:24:f6:54:07:1a:c7:76:3e:8e:d4:66:e0:b5:90:d6
```

*FIG. 12*

```
Certificate:
    Data:
        Version: 3 (0x2)
        Serial Number:
            58:d8:27:ee:1e:6c:65:c8:e1:e3:6c:5e:06:c9:0c:7f:e1:67:7f:c0
    Signature Algorithm: ecdsa-with-SHA256
        Issuer: CN=Fyde Intermediary Certificate Authority
        Validity
            Not Before: Nov 20 07:21:43 2018 GMT
            Not After : May 20 19:22:13 2021 GMT
        Subject: CN=fyde://3b4e6458-adbf-4721-b8cf-65912e35c695/
        Subject Public Key Info:
            Public Key Algorithm: id-ecPublicKey
                Public-Key: (256 bit)
                pub:
                    04:1b:24:91:6e:99:3f:e4:cf:ed:c1:98:92:be:72:
                    cd:2a:f4:69:88:94:24:f3:e5:c3:4c:1a:0c:aa:43:
                    75:ab:aa:cb:5e:19:4b:3c:9a:60:92:09:ad:f7:93:
                    42:5f:93:65:fd:2d:97:93:61:80:41:7d:81:ac:38:
                    53:ef:51:3d:2b
                ASN1 OID: prime256v1
                NIST CURVE: P-256
        X509v3 extensions:
            X509v3 Key Usage: critical
                Certificate Sign, CRL Sign
            X509v3 Basic Constraints: critical
                CA:TRUE, pathlen:0
            X509v3 Subject Key Identifier:
                AA:7D:01:CF:D3:6A:23:6F:9B:EF:8A:7C:C6:6F:89:A6:DF:58:A5:A5
            X509v3 Authority Key Identifier:
                keyid:BA:7F:C0:B2:15:67:50:EE:EC:35:C9:61:81:88:CD:A8:51:30:C8:DB Authority Information Access:
                CA Issuers - URI:http://127.0.0.1:8200/v1/pki-mc-int/ca X509v3 CRL Distribution Points:

Full Name:
                  URI:http://127.0.0.1:8200/v1/pki-mc-int/crl

Signature Algorithm: ecdsa-with-SHA256
         30:45:02:21:00:f7:d4:ad:a0:a8:8f:70:08:26:76:49:4e:12:
         d3:24:7e:fc:bd:b3:e1:5c:9b:a2:0f:11:d1:3f:1b:3b:17:ad:
         a8:02:20:5c:df:95:a0:a5:45:c2:c4:67:d4:bd:31:6e:3b:f9:
         77:29:50:0a:b9:e1:4d:69:0f:00:54:48:7e:d3:b8:cb:7a
```

*FIG. 13*

```
Certificate:
    Data:
        Version: 3 (0x2)
        Serial Number:
            64:21:5d:72:9f:2f:10:f9:99:ee:79:ac:2c:0b:2c:9a:8b:b4:fb:61
    Signature Algorithm: ecdsa-with-SHA256
        Issuer: CN=fyde://3b4e6458-adbf-4721-b8cf-65912e35c695/
        Validity
            Not Before: Nov 25 08:56:35 2018 GMT
            Not After : Nov 25 08:57:05 2019 GMT
        Subject: CN=fyde://3b4e6458-adbf-4721-b8cf-65912e35c695/device-user/325d8700-34b7-4a38-8355-954758689a5f
        Subject Public Key Info:
            Public Key Algorithm: id-ecPublicKey
                Public-Key: (256 bit)
                pub:
                    04:bc:18:89:c8:4b:93:b2:59:cf:56:f9:b8:d6:be:
                    bb:16:77:26:b8:86:ef:39:3b:3b:7c:98:9a:e0:a1:
                    f6:19:4f:6f:88:57:42:8e:72:aa:d2:be:19:a8:b2:
                    a8:3c:da:08:30:f5:0d:88:22:b1:51:f5:f3:58:90:
                    b6:aa:e6:e4:be
                ASN1 OID: prime256v1
                NIST CURVE: P-256
        X509v3 extensions:
            X509v3 Key Usage: critical
                Digital Signature, Key Encipherment, Key Agreement
            X509v3 Extended Key Usage:
                TLS Web Server Authentication, TLS Web Client Authentication
            X509v3 Subject Key Identifier:
                DC:46:BB:61:96:80:AA:02:9E:F3:B2:96:4F:FA:D6:FF:E9:AC:A4:B9
            X509v3 Authority Key Identifier:
                keyid:AA:7D:01:CF:D3:6A:23:6F:9B:EF:8A:7C:C6:6F:89:A6:DF:58:A5:A5

Signature Algorithm: ecdsa-with-SHA256
        30:45:02:21:00:c6:c3:f3:90:b1:1a:05:69:32:6b:1d:b7:f3:
        3d:f5:7f:c4:e4:ed:49:5b:2d:24:0f:21:f4:e5:ea:69:4c:88:
        cc:02:20:1e:c8:02:b2:73:b0:f5:35:8b:da:64:c4:b5:c9:4e:
        17:10:d5:a7:8e:84:b5:c7:c1:29:f6:73:1e:8c:e8:16:5b
```

*FIG. 14*

```
Certificate:
    Data:
        Version: 3 (0x2)
        Serial Number:
            75:05:24:5c:9e:14:f7:20:7c:b7:22:88:4c:51:8d:21:9b:b6:01:35
    Signature Algorithm: ecdsa-with-SHA256
        Issuer: CN=fyde://3b4e6458-adbf-4721-b8cf-65912e35c695/
        Validity
            Not Before: Nov 20 10:04:49 2018 GMT
            Not After : Nov 20 10:05:19 2019 GMT
        Subject:
        Subject Public Key Info:
            Public Key Algorithm: id-ecPublicKey
                Public-Key: (256 bit)
                pub:
                    04:12:f0:dc:11:f5:8d:45:6e:c5:99:d7:a9:84:bc:
                    85:03:31:7f:d8:32:c8:58:cd:bf:e1:53:e6:a3:3e:
                    0d:34:ae:04:65:f7:f6:6c:fb:81:05:15:40:35:05:
                    e9:cf:11:c7:9a:0c:95:31:6c:49:8a:04:20:56:87:
                    f3:27:64:2f:13
                ASN1 OID: prime256v1
                NIST CURVE: P-256
        X509v3 extensions:
            X509v3 Key Usage: critical
                Digital Signature, Key Encipherment, Key Agreement
            X509v3 Extended Key Usage:
                TLS Web Server Authentication, TLS Web Client Authentication
            X509v3 Subject Key Identifier:
                B8:4D:A4:F9:BB:DB:0D:BC:F8:56:CA:EE:F3:B7:DC:C3:DB:F2:AB:0D
            X509v3 Authority Key Identifier:
                keyid:AA:7D:01:CF:D3:6A:23:6F:9B:EF:8A:7C:C6:6F:89:A6:DF:58:A5:A5

X509v3 Subject Alternative Name: critical
                URI:fyde://3b4e6458-adbf-4721-b8cf-65912e35c695/proxy/1b50748b-a801-4fd4-9056-107dc5b6d638
    Signature Algorithm: ecdsa-with-SHA256
         30:45:02:20:48:b6:47:88:eb:5a:1f:c0:d1:cb:c1:39:10:52:
         d5:4a:e9:ba:96:1c:a7:88:ae:17:ad:d5:1d:bb:9d:42:21:64:
         02:21:00:b9:96:83:c9:d6:07:be:21:9f:22:53:bc:23:77:18:
         eb:fc:8c:a7:fa:4c:63:00:03:ab:98:c8:ba:6f:96:d0:ff
```

*FIG. 15*

Access

Resources 8    Access Proxies 6

| | Name | Location | Proxy Host | Port | Resources | |
|---|---|---|---|---|---|---|
| ☐ | Fyde VPC Proxy | - | proxy.fyde.com | 443 | 1 | ⊘ |
| ☐ | Fyde Internet Proxy | - | Proxy-outbound.fyde.com | 443 | 0 | ⊘ |
| ☐ | Fyde Internal Proxy | - | int.fyde.com | 443 | 0 | ⊘ |
| ☐ | Fyde Test | - | test-proxy.internal | 443 | 0 | ⊘ |
| ☐ | Fyde Proxy 01 | PT-OPO | oporto.tech.fyde.com | 8003 | 0 | ⊘ |
| ☐ | PT-OPO-TUN018003 | Oporto | oporto.tech.fyde.com | 8003 | 7 | ⊘ |

Page 1 of 1

ACCESS PROXY PLATFORM

CROSS REFERENCE TO OTHER APPLICATIONS

This application claims priority to U.S. Provisional Patent Application No. 62/796,490 entitled ACCESS PROXY filed Jan. 24, 2019 which is incorporated herein by reference for all purposes.

This application claims priority to U.S. Provisional Patent Application No. 62/804,645 entitled ACCESS PROXY PLATFORM filed Feb. 12, 2019 which is incorporated herein by reference for all purposes.

BACKGROUND OF THE INVENTION

Network traffic inspection has been a long-term technical challenge, with increased difficulty as technology evolves and more devices with heterogeneous operating systems are added to the system. Applications of network traffic inspection range from network traffic measurements and bandwidth control to monitoring and security applications, such as intrusion or threat prevention detection.

In an example, a user receives an email or a text as part of a phishing attack. The email or text includes a link to a phishing website that is designed as a clone of a well-known website. When the user clicks on the link, the phishing website is displayed on his computer, and the user is tricked into believing that the phishing website is the well-known website. The user is prompted to enter his login ID and his password, and he enters this sensitive information, which is then captured by the phishing website. The criminals that operate the phishing website are able to exploit this sensitive information by using it to log in to the well-known website.

One application of network traffic inspection is related to security. If the network traffic of the user's access of the phishing website could be inspected by a security application, the security application could detect that the user is accessing a suspicious website, and could flag the access as a potential security threat.

BRIEF DESCRIPTION OF THE DRAWINGS

Various embodiments of the invention are disclosed in the following detailed description and the accompanying drawings.

FIGS. 7A-7E are illustrations of various security threats, consistent with various embodiments.

FIGS. 11-15 illustrate various example certificates in a PKI hierarchy.

FIG. 20 shows a list of configured proxies as rendered in an administrative console.

DETAILED DESCRIPTION

Figure 1:
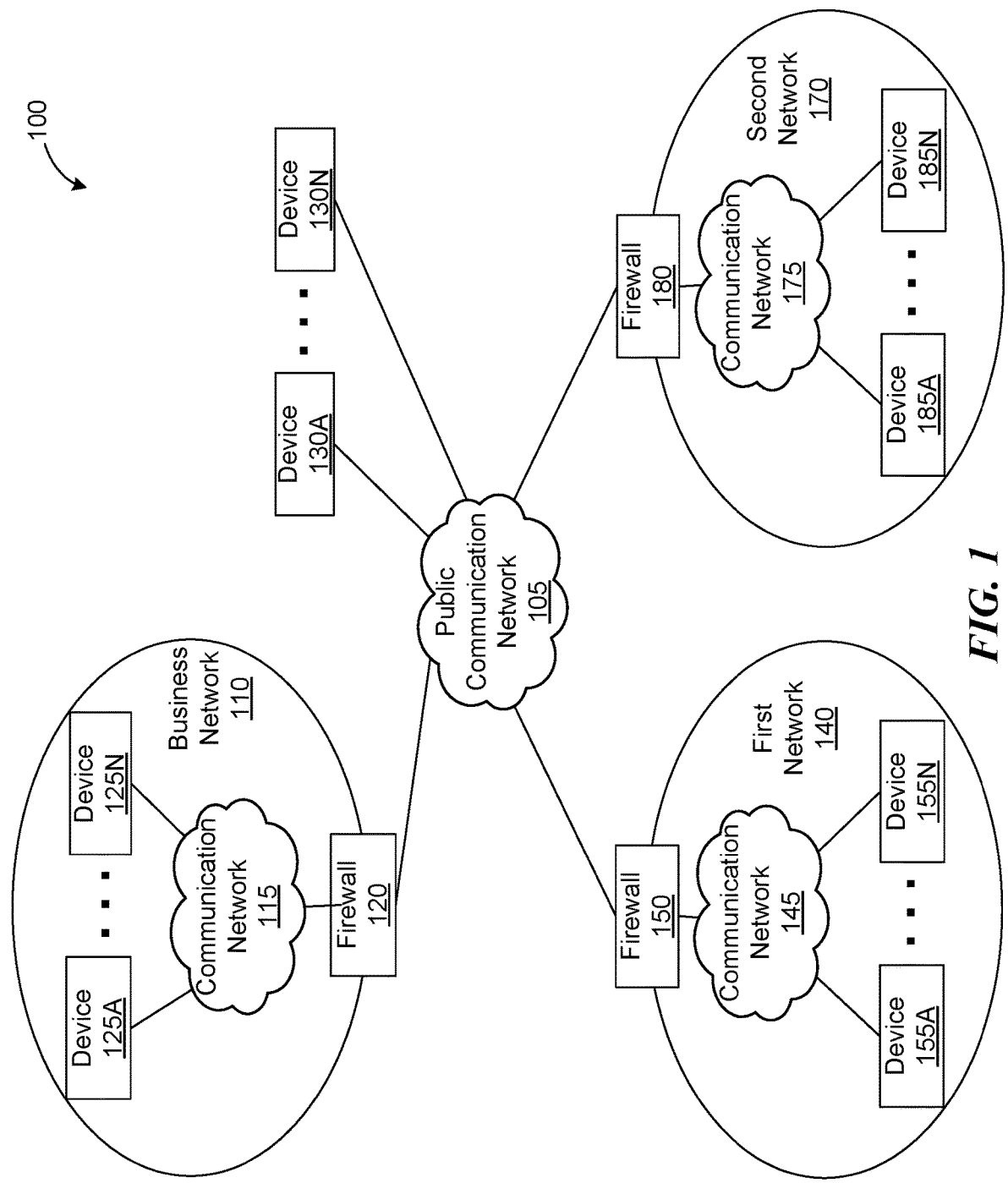
FIG. 1 is an illustration of a networking environment, consistent with various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Introduction

Described herein are various techniques for monitoring and securing network communications. Various existing techniques for monitoring network communications suffer various deficiencies. For example, some security applications are installed with enhanced privileges to allow the security application to access network traffic, such as by use of privileged commands or resources. Because the security application is installed with enhanced privileges, security holes in the security application can be exploited by attackers to gain access to privileged commands, resources, etc., thereby enabling a possibly major security breach. Other security applications are installed as a standard application where a user needs to launch the security application after each reboot or power on of the computer system on which the security application is installed. When a user neglects to launch the security application, the computer system is not protected by the security application, once again enabling a possibly major security breach.

Yet other security applications rely on remote servers for analyzing network communications. In an example, a user installs a security application that directs monitored network communications to a remote server, where the network communications are analyzed to determine if they indicate a security threat. Such a technique suffers various deficiencies, for example: adding significant latency to data access, resulting in, e.g., degraded performance when web browsing; increasing communication network usage, resulting in increased data charges for a cellular carrier; or increasing the power consumption of the computer system, resulting in a shorter battery life when the computer system is a battery powered device, such as a smart phone.

Various embodiments of the techniques disclosed herein are able to avoid some or all of the above mentioned deficiencies. In an example, rather than being installed with elevated privileges to enable access to network traffic, a security application is installed as an operating system extension and utilizes a network extension service of the operating system. Examples of operating systems include Mac OS, iOS, Android, Windows, Linux, Chrome OS, HP-UX, SCO Unix, Solaris, BSD, and FreeBSD. By using a network extension service, such as a virtual private network (VPN) stack of the operating system, the security application is able to access network traffic while executing in, e.g., a non-privileged sandboxed process controlled by the operating system. Executing in a non-privileged sandboxed process enhances security by preventing the security application from being able to access certain sensitive resources, such as protected system resources or resources attributed to other applications. When a security application is executing in a sandboxed process, an attacker that exploits a security hole of the security application is prevented from accessing these sensitive resources, resulting in improved security.

Further, because the security application of this example is installed as an operating system extension, the security application is initialized each time that the operating system is initialized, such as when the computer system is rebooted or powered on. At each reboot or power on, the operating system is initialized and, at a certain point during initialization, begins to initialize operating system extensions, which include the security application. As a result, a user does not need to remember to launch the security application. The security application, due to being an operating system extension, is launched each time the operating system is initialized.

In an example where a security application uses the VPN stack, the security application intercepts network traffic by conceptually creating a VPN tunnel that starts and ends at the computer system. A typical VPN tunnel provides protected communication between two computer systems, where data sent via the VPN tunnel is encrypted while traveling between the two computer systems. In this example, rather than creating a true VPN tunnel between two computer systems, the security application uses the VPN stack to intercept network traffic before the network traffic is transmitted to a communication network or to any other computer. By using the VPN stack, or other network extension service, the security application is able to locally analyze the network traffic to determine if the traffic indicates a potential security threat. This local analysis advantageously results in reduced data access latency and lower communication network usage as compared to a system that sends network traffic to a remote system for analysis. When a potential security threat is indicated, the security application can prevent the network traffic from being transmitted to a communication network and being delivered to the destination computer system.

In some cases, the local computer system may not be capable of adequately analyzing a portion of the network traffic, or analyzing some or all of the network traffic locally may not be desirable for some reason. In such a case, the security application can send the portion of the network traffic to be analyzed to a remote server for analysis. For example, the security application can create a VPN tunnel between the local computer system and the remote server, and can securely send the portion of the network traffic to the remote server for analysis. In a first scenario, the security application waits for the remote server to complete its analysis of the network traffic that was sent to the remote server by the computer system before transmitting the network traffic to a communication network for delivery to the destination computer system. When the remote server determines that the network traffic indicates a potential security threat, the remote server notifies the security application and the security application prevents the network traffic from being transmitted to a communication network and being delivered to the destination computer system. When the remote server determines that the network traffic does not indicate a potential security threat, the security application transmits the network traffic to the communication network where it is delivered to the destination computer system.

In a second scenario, the security application sends the network traffic to the remote server for analysis, but does not wait for the remote server to complete its analysis before transmitting the network traffic to a communication network for delivery to the destination computer system, resulting in reduced latency of data access. If the remote server determines that the network traffic indicates a potential security threat, the remote server notifies the security application and the security application prevents any additional network traffic destined for the destination computer system from being delivered. When the remote server is able to make the determination in a timely fashion, communication with the destination computer system can be stopped before the potential security threat materializes into an actual security breach of the local computer system.

In some embodiments, a person makes a determination whether the network traffic indicates a potential security threat. In an example, the local computer system is being used by a child. When the child accesses unauthorized network data, such as by accessing a website that does not appear in a whitelisted list of websites, the security application intercepts the network traffic and notifies the parent that the child is accessing an un-authorized website, such as by sending a message to the parent's smart phone that causes a notification that indicates the potential security threat to be displayed by the smart phone. The security application prevents the network traffic from being sent to the destination computer system until a response is received from the parent's smart phone. If the smart phone sends a message to the security application that indicates that the parent authorizes the access, the security application adds the website to the whitelisted list of websites, and transmits the network traffic to the communication network for delivery to the destination computer system, enabling the child to access the website. If the parent denies the access, the security application adds the website to a blacklisted list of websites, and prevents the network traffic from being transmitted to the communication network, resulting in the child being prevented from accessing the website.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof. References in this description to "an embodiment," "one embodiment," or the like, mean that the particular feature, function, structure, or characteristic being described is included in at least one embodiment of the present disclosure. Occurrences of such phrases in this specification do not necessarily all refer to the same embodiment. On the other hand, the embodiments referred to also are not necessarily mutually exclusive.

As used herein, terms such as "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Note that in this description, any references to sending or transmitting a message, signal, etc. to another device (recipient device) mean that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

As used herein, unless specifically stated otherwise, the term "or" can encompass all possible combinations, except where infeasible. For example, if it is stated that data can include A or B, then, unless specifically stated otherwise or infeasible, the data can include A, or B, or A and B. As a second example, if it is stated that data can include A, B, or C, then, unless specifically stated otherwise or infeasible, the data can include A, or B, or C, or A and B, or A and C, or B and C, or A and B and C.

II. Network Traffic Inspection

Described throughout the Specification are various embodiments of devices/platforms in various environments for monitoring network communications. Various techniques described throughout the Specification can be used in conjunction with embodiments of components described in this Section. For example, embodiments of software described herein as being installed on devices (e.g., the Fyde app) can be configured to provide access proxy support, can be configured to implement a reverse TCP/IP stack, and/or can make use of various other techniques described herein.

FIG. 1 is an illustration of a networking environment, consistent with various embodiments. Network environment 100 includes three networks that are each protected by a firewall: business network 110, first network 140, and second network 170. Each of the three networks includes a communication network that enables data communication between computing devices that are members of the network. For example, business network 110 includes communication network 115, which includes a plurality of devices (e.g., device 125A, device 125N, etc., referred to collectively as "devices 125"), which enables devices 125 to communicate with each other, with firewall 120, etc. First network 140 includes communication network 145, which includes a plurality of devices (e.g., device 155A, device 155N, etc., referred to collectively as "devices 155"), which enables devices 155 to communicate with each other, with firewall 150, etc. Second network 170 includes communication network 175, which includes a plurality of devices (e.g., device 185A, device 185N, etc., referred to collectively as "devices 185") which enables devices 185 to communicate with each other, with firewall 180, etc.

The firewall of each of the three networks acts as a barrier to protect the network by keeping unauthorized network traffic out of the network. For example, firewall 120 protects business network 110, firewall 150 protects first network 140, and firewall 180 protects second network 170. Public communication network 105 is a public network, such as the Internet or any other public network. Public communication network 105, which includes a plurality of devices (e.g., device 130A, device 130N, etc., referred to collectively as "devices 130"), enables devices 130, firewall 120, firewall 150, firewall 180, etc. to all communicate with each other.

Communication networks 115, 145, and 175, and public communication network 105 can be any type of network that enables data communication between computers. In various embodiments, one or more of communication networks 115, 145, and 175, and public communication network 105 are or include any of a local area network (LAN), a wide area network (WAN), a virtual private network (VPN), a private network, a public network, a cellular network, a short-range wireless network, a wireless local area network (WLAN), etc. The cellular network can be any of various types, such as code division multiple access (CDMA), time division multiple access (TDMA), global system for mobile communications (GSM), long term evolution (LTE), 2G, 3G, 4G, etc. The short-range wireless network, which is used for short-range wireless communications, can also be any of various types, such as Bluetooth, Bluetooth low energy (BLE), near field communication (NFC), etc. The WLAN can similarly be any of various types, such as the various types of IEEE 802.11 networks, among others. Public communication network 105 can be any type of public communication network, such as the Internet.

Devices 125, 130, 155, and 185 can be any type of computing device, such as a desktop computer, a laptop computer, a file server, a network attached storage (NAS) device, a mobile device, or a server, among others. Examples of mobile devices include smart phones, tablets, portable media devices, wearable devices, laptops, and other portable computers. In some embodiments, first network 140 represents a cloud storage or cloud compute provider, and second network 170 represents a home network.

Figure 2:
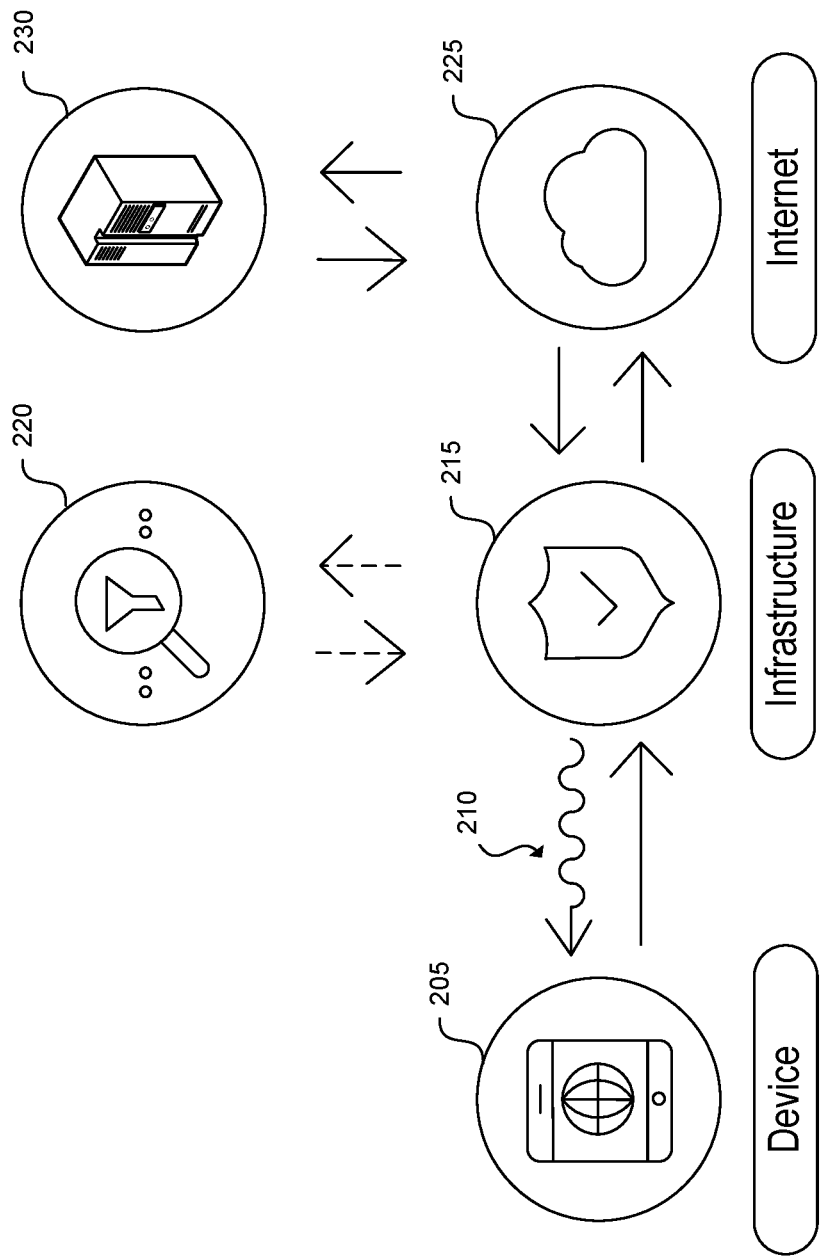
FIG. 2 is an illustration of a first network traffic inspection environment, consistent with various embodiments.

FIG. 2 is an illustration of a first network traffic inspection environment, consistent with various embodiments. In the example of FIG. 2, smartphone 205 can be device 185A of FIG. 1, computer 215 can be device 125A, Internet 225 can be public communication network 105, and security application 220 can be executing on computer 215, or another computer. Many other configurations are possible, and this is just one possible configuration. In the example of FIG. 2, a user utilizes a web browser of smartphone 205 to access a website. The user inputs a Uniform Resource Locator (URL), and, when the host section of the URL is not an Internet Protocol (IP) address, the host section of the URL is translated to an IP address by use of a Domain Name Service (DNS). The IP address in this example happens to be the IP address of destination computer 230. Smartphone 205 creates and sends one or more IP packets via a cellular network to initiate the website access. An IP packet can be an Internet Protocol Version 4 (IPv4) packet, or an Internet Protocol Version 6 (IPv6) packet, among others. Smartphone 205 sends the IP packets for delivery to destination computer 230, which hosts the website. The IP packets, which include the IP address associated with the URL, are intercepted by communication channel 210, which is a VPN tunnel between smartphone 205 and computer 215. The IP packets intercepted by communication channel 210 are sent to computer 215 for analysis by a security application, which can be executing on computer 215 or another computer.

As the IP packets are sent between smartphone 205 and computer 215, data charges from the cellular service provider are incurred. Computer 215 sends the IP packets to the security application. The security application determines that the IP packets do not indicate a security threat, and computer 215 forwards the packets for delivery to destination computer 230 via Internet 225. Destination computer 230 sends the requested website data to computer 215 via Internet 225, and computer 215 forwards the website data to smart phone 205 by use of communication channel 210. The user of smart phone 205 is annoyed due to the slow response to his website data request. He is further annoyed when he receives his bill from his cellular provider, and sees how much in data charges he has incurred.

Figure 3A:
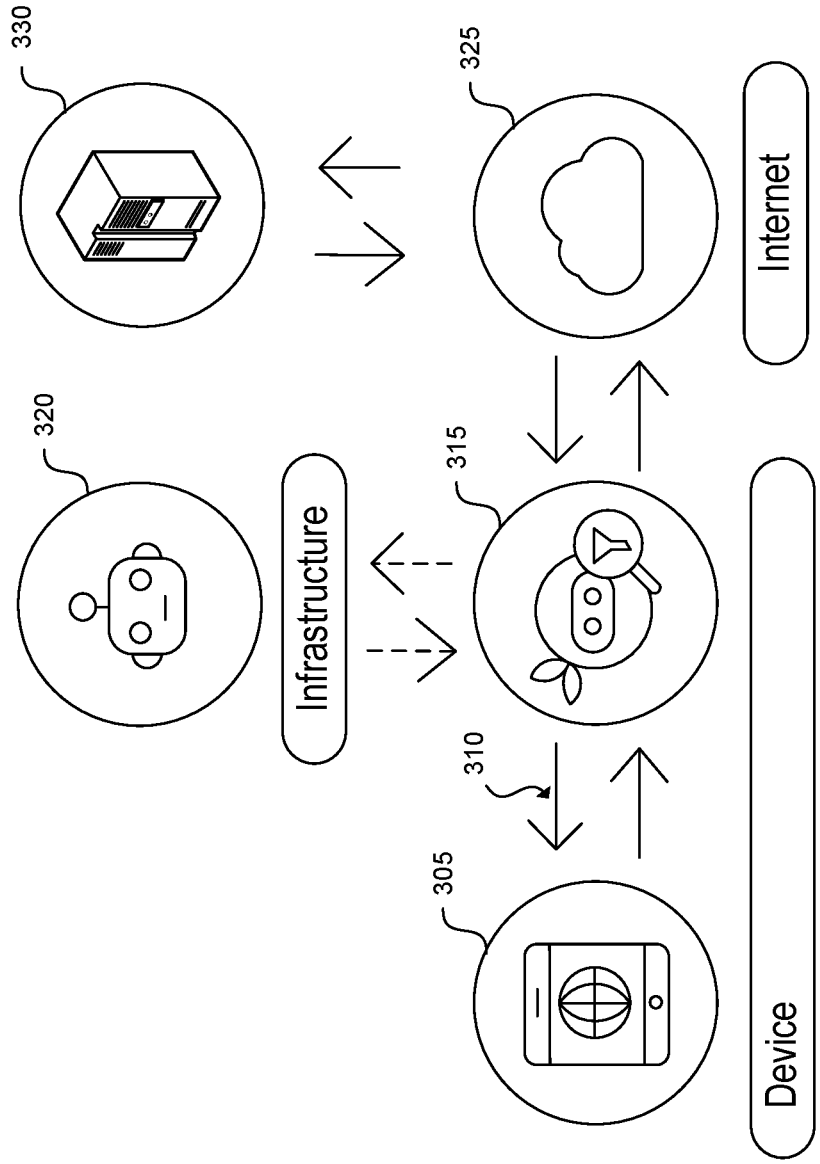
FIG. 3A is an illustration of a second network traffic inspection environment, consistent with various embodiments.
Figure 3B:
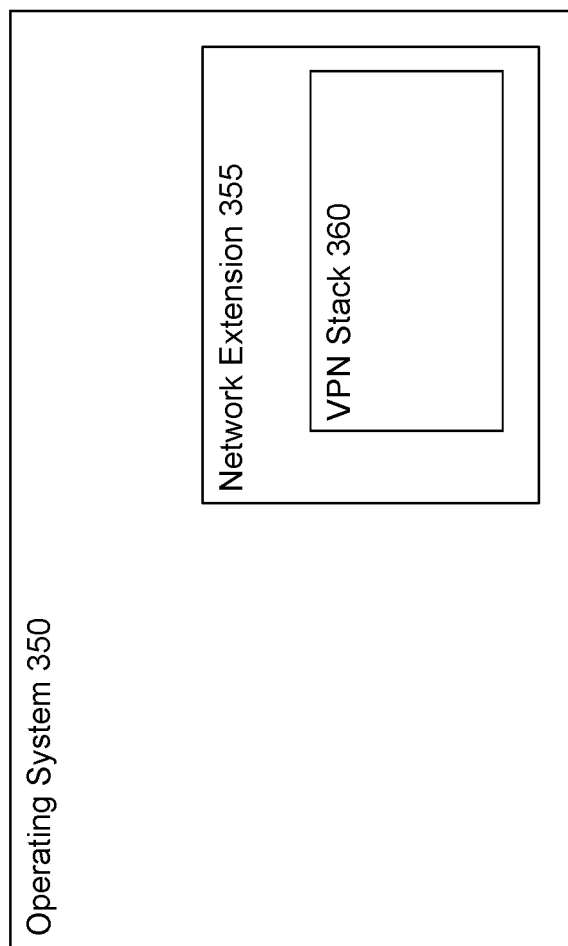
FIG. 3B is a block diagram illustrating networking components of an operating system running at a computer at the second network traffic inspection environment, consistent with various embodiments.

FIG. 3A is an illustration of a second network traffic inspection environment, consistent with various embodiments. In the example of FIG. 3A, smartphone 305 can be device 185A of FIG. 1 and is running operating system 350 of FIG. 3B, computer 320 can be device 125A, Internet 325 can be public communication network 105, and security application 315 is executing at smartphone 305. Many other configurations are possible, and this is just one possible configuration. In the example of FIGS. 3A and 3B, a user uses a web browser of smartphone 305 to access a website. The user inputs a URL, and the URL is translated to an IP address, which corresponds to destination computer 330, by smartphone 305, in some embodiments with the assistance of operating system 350. Smartphone 305 creates and sends one or more IP packets to initiate the website access, and sends the IP packets for delivery to destination computer 330, which hosts the website. However, the IP packets are intercepted by communication extension 310, which in this example is an extension of operating system 350, namely, network extension 355, before the IP packets are transmitted to a communication network. Communication extension 310 is implemented by use of a network extension service of the operating system. In this example, network extension 355 utilizes a VPN stack of the operating system, namely, VPN stack 360, in order to intercept network traffic before the traffic is transmitted to a communication network.

For IP packets that are analyzed by security application 315, advantageously no data charges are incurred from the cellular service provider as a result of analysis because the IP packets are analyzed by security application 315 before the data is transmitted to a communication network. In some cases, security application 315 when running on smartphone 305 may not be able to adequately analyze all IP packets, or it may be otherwise undesirable to analyze some or all of the IP packets locally. In those cases, security application 315 can send the packets to be further analyzed to computer 320, which may be a cloud computer, for analysis. When security application 315 determines that the IP packets indicate a security threat, security application 315 prevents the IP packets from being transmitted to a communication network, such as Internet 325. Security application 315 causes a message to be displayed on smartphone 305, such as message 605 of FIG. 6. When security application 315 determines that the IP packets do not indicate a security threat, security application 315 allows the IP packets to be transmitted to a communication network for delivery to destination computer 330.

Figure 4:
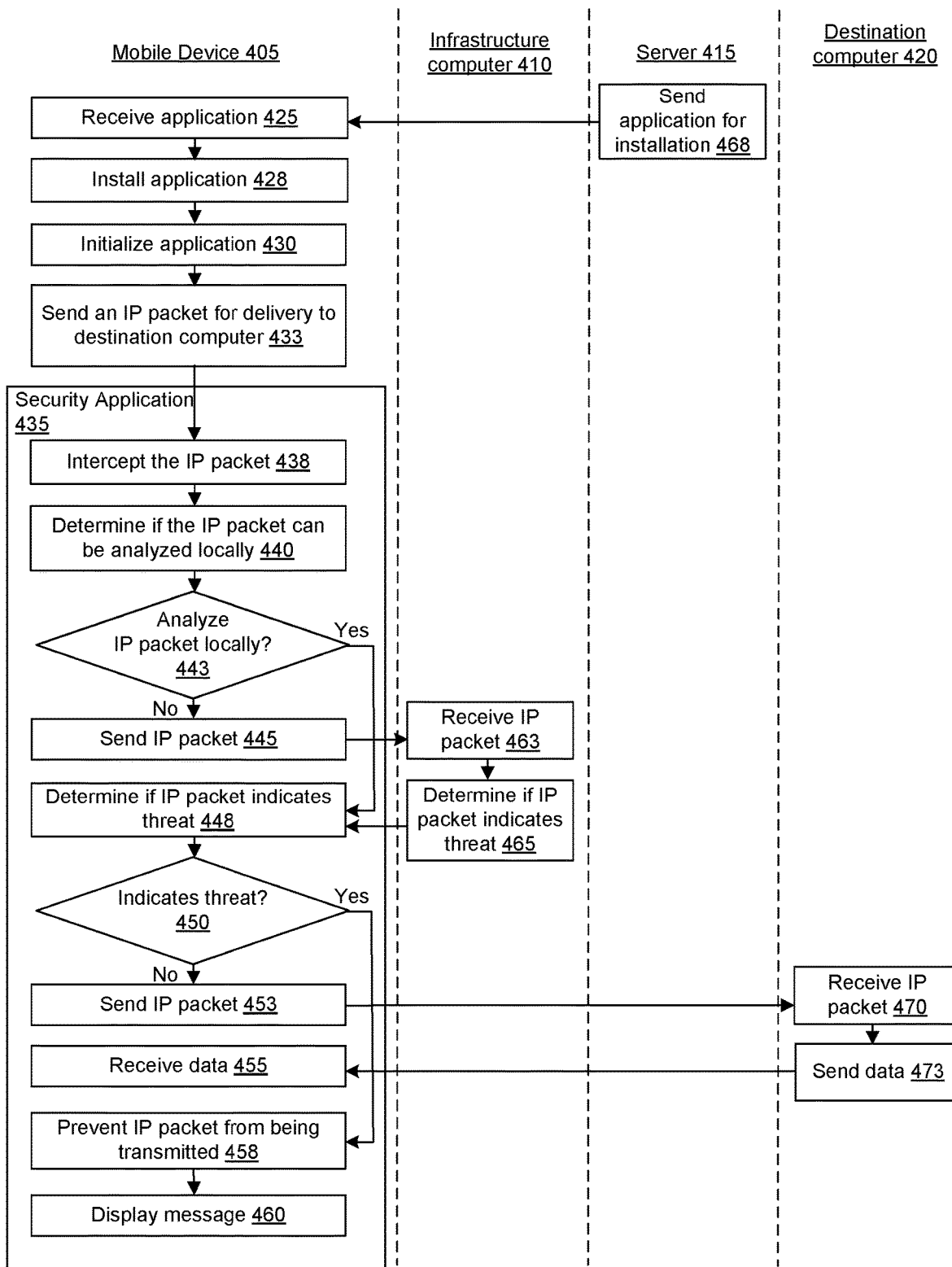
FIG. 4 is an illustration of a method for inspecting network traffic, consistent with various embodiments.
Figure 5:
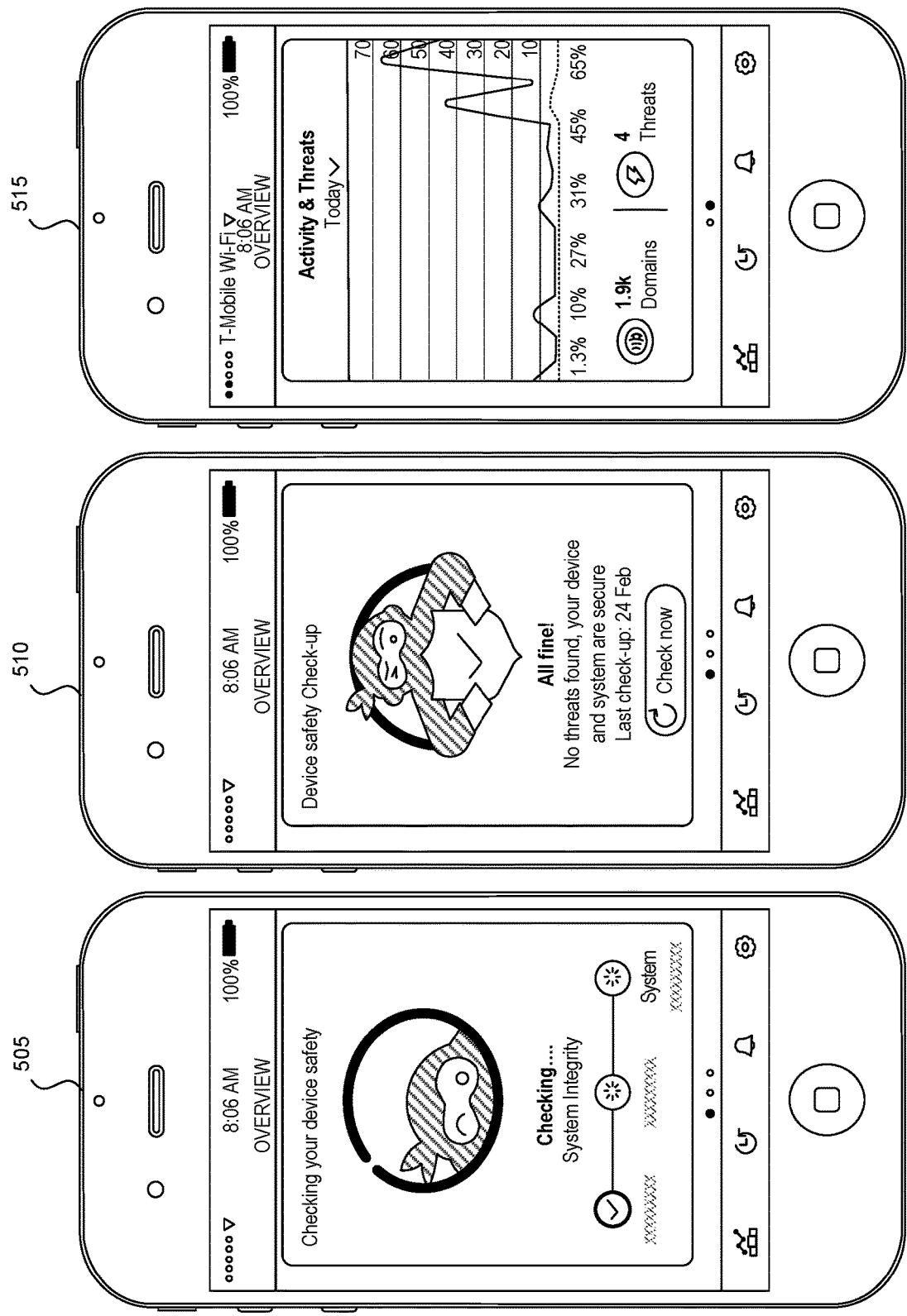
FIGS. 5 and 6 are illustrations of security-related messages being displayed on mobile devices, consistent with various embodiments.

FIG. 4 is an illustration of a method for inspecting network traffic, consistent with various embodiments. In the example of FIG. 4, mobile device 405 can be device 185A of FIG. 1, infrastructure computer 410 can be device 125A, server 415 can be device 125N, and destination computer 420 can be device 155A. Many other configurations are possible, and this is just one possible configuration. A user has a friend who had his identity stolen, and who has been spending a lot of time trying to recover from this criminal act. After some exploration, the user has discovered that there are many ways that a user's online security can be jeopardized. During his investigation, he came across a number of examples of security threats, such as phishing, spear-phishing, smishing, infiltration and exfiltration from botnets, as well as the examples illustrated in FIGS. 7A-7E. The user decides to download a security application. He uses his mobile device to navigate to an online application store, where he initiates the download and install of the security application. While the user of this example is using a mobile device, the user can be using any type of computing device. At block 468, server 415 sends a download package for the security application to the user's mobile device, mobile device 405, where at block 425, mobile device 405 receives the download package for the security application.

At block 428, mobile device 405 installs the security application as an operating system extension, and at block 430, the mobile device initializes/launches the security application. An operating system extension is software that extends the operating system's functionality, and that is initiated/launched at startup time (e.g., at power on, reboot, etc. of the device) by the operating system. Typical applications are not installed as operating system extensions. As a result, a user needs to remember to initialize/launch such applications. Further, a typical application may not be able to access certain sensitive resources, unless installed with elevated privileges. To enable access to certain resources, some applications are installed with elevated privileges, with a resulting increase in the potential severity of damage that can result from an attack that takes advantage of any security hole in the application.

When a software program, also referred to as an application, is installed as an operating system extension, the operating system can execute the software program in a sandboxed process, which is a restricted operating system environment where access to resources can be controlled by the operating system. Sandboxing is a security technique that isolates programs, preventing malicious or malfunctioning programs, such as a program that has suffered a security breach from an attack that takes advantage of a security hole of the program, from accessing, damaging, or snooping on protected resources of a user's computer.

After the security application is installed and initialized, the user selects and launches an application, and the selected application generates some network traffic. The selected application can be any application that generates network traffic, such as a web browser or any other application that communicates with other computers via a network. At block 433, the selected application sends an IP packet for delivery to destination computer 420. In some embodiments, the selected application sends the IP packet for delivery to destination computer 420 when the selected application sends a message that prompts generation of the IP packet and that indicates to deliver the IP packet to destination computer 420. For example, the selected application can send the IP packet for delivery to destination computer 420 by sending a message that includes a URL of a webpage that is hosted by destination computer 420, or by sending any other message that prompts generation of the IP packet and that indicates to deliver the IP packet to destination computer 420.

At block 438, the security application, represented by security application 435 in FIG. 4 (which indicates the blocks executed/caused/triggered/etc. by security application 435 in the example of FIG. 4 by enclosing the blocks), intercepts the IP packet. In some embodiments, the security application uses functionality available via a network extension service of the operating system to intercept or monitor network traffic. In some embodiments, a network extension service is a framework that contains application program interfaces (APIs) that can be used to customize and extend the core networking features of the operating system. In an example, the network extension service utilizes functionality available via a VPN stack of the operating system to enable interception or monitoring of network traffic. In another example, the network extension service is the VPN stack of the operating system. A networking extension service can be, for example, network extension 355 of FIG. 3B, and a VPN stack can be VPN stack 360.

The IP packet can be intercepted by the security application in any of various ways. In a first example where the selected application sends the IP packet by sending a message that includes a URL that indicates destination computer 420, the security application intercepts the IP packet by intercepting a message that includes the URL (block 438). In a second example where the selected application sends the IP packet by sending a message that includes a URL that indicates destination computer 420, the operating system, in combination with other communications/networking functionality of mobile device 405, maps the URL to the IP address of destination computer 420 and generates an IP packet for delivery to destination computer 420. Before the IP packet is transmitted to a communication network, such as a cellular network, the IP packet is intercepted by the security application (block 438).

At block 440, the security application determines whether the IP packet can be analyzed locally, such as to determine if the IP packet indicates a security threat. Analyzing the IP packet locally can have several advantages, such as reduced network traffic due to not sending the IP packet to a remote device, increased privacy and reduced latency due to not sending the IP packet to a remote device for analysis, increased robustness due to not sending the IP packet to a remote server that may be susceptible to, e.g., a denial of service attack, or for other reasons. The determination as to whether to analyze the IP packet locally can be based on any of various factors. For example, the determination can be based on the processing power of the local device, the memory storage capacity of the local device, the data or other resources available to the local device, the amount of power that performing the analysis locally would consume, the current utilization of the local device, etc. When the security application determines to analyze the IP packet locally (block 443), the security application determines whether the IP packet indicates a threat (448) based on an analysis of the IP packet performed locally. When the security application determines to analyze the IP packet remotely (block 443), the security application determines whether the IP packet indicates a threat (448) based on an analysis of the IP packet transmitted (445)/performed remotely upon receipt (463/465). The determination by the security application as to whether the IP packet indicates a threat (448) can in turn be based on a determination by a remote computer, e.g., infrastructure computer 410 in the example of FIG. 4, that the packet indicates a threat (block 465), and may also additionally be based on analysis performed by the local device (e.g., mobile device 405).

The determination whether an IP packet indicates a threat (block 448/465) can be based on any of various analyses. In some embodiments, an analysis of an IP packet includes an analysis of other IP packets that are associated with the IP packet. In yet other embodiments, an analysis of an IP packet includes an analysis of other data that is associated with the IP packet, such as an email message, a short message system (SMS) message, a domain name, etc., among others. In some cases, the IP address or domain name indicating the destination of the IP packet is compared against a blacklist of IP addresses or domain names, where the blacklisted IP addresses and domain names indicate a security threat, or against a whitelist of IP addresses or domain names, where the whitelisted IP addresses and domain names do not indicate a security threat. For example, a user may be fooled by the phishing message of FIG. 7A, and may click on CHANGE PASSWORD in response to the phishing message. When the user clicks on CHANGE PASSWORD, mobile device 405 attempts to communicate with a phishing website and sends an IP packet for delivery to the phishing website (block 433). The security application intercepts the IP packet (block 438), and, depending on block 443, mobile device 405 or infrastructure computer 410 determines that an IP address indicated by the IP packet appears in a blacklist of IP addresses, and determines that the IP packet indicates a threat (block 448/465).

In other cases, an email message that includes a website link that a user clicks on is analyzed as part of analyzing the IP packet. For example, a user may receive the email message of FIG. 7B or of FIG. 7D. The user, being fooled by the email message, which may be a phishing email, clicks on a website link contained within the message. In response, mobile device 405 attempts to communicate with the website that is associated with the website link and sends an IP packet for delivery to the website (block 433). The security application intercepts the IP packet (block 438), detects that the IP packet was sent in association with clicking on the website link in the email message, and, depending on block 443, mobile device 405 or infrastructure computer 410 analyzes the email message as part of analyzing the IP packet. For the email of FIG. 7B, the analysis includes analyzing the email address of the sender, express@ssl1-airnb.com, which appears in the message of FIG. 7B. For the email of FIG. 7C, the analysis includes analyzing the domain name of the website, update-apple.uk, which appears in the message of FIG. 7C. For the email of FIG. 7D, the analysis includes analyzing the domain name of the website, which, while it is not visible in the email, is accessible via the message of FIG. 7D, such as via a URL included in the message of FIG. 7D and accessible via the website link.

The domain names of these examples raise suspicion in, e.g., at least two ways. First is that the domain name associated with the email address (ssl1-airnb.com) or the URL (update-apple.uk) is each similar to a well-known domain name (airbnb.com or apple.com), and second is that the ssl1-airnb.com domain name includes a potentially misleading character, in that the hyphen between ssl1 and airnb can be interpreted by a user to indicate a subdomain (e.g., to indicate that ssl1 is a subdomain of airnb, as ssl1.airnb would properly indicate that ssl1 was a subdomain of airnb). For the email of FIG. 7D, the analysis includes analyzing the email, which indicates that the email includes a link to a Google doc, and includes analyzing the website link (activated by clicking on "Open in Docs"). The website link raises a suspicion because it is not a link to a Google doc, nor even to a valid Google website. Based on these suspicions, mobile device 405 or infrastructure computer 410 determines that the IP packet indicates a threat (block 448/465). In some cases, the domain name may appear in a list of whitelisted or blacklisted domain names.

In yet other cases, an SMS message that includes a website link that a user clicks on is analyzed as part of analyzing the IP packet. For example, a user may receive the SMS message of FIG. 7E. The user, being fooled by the SMS message, clicks on https://Icloud.com/FindMyiPhone/, which is a website link contained in the message. The user is fooled in that he does not recognize that the "i" in icloud is not an "i," but rather is the international character "î" (i-circumflex, a letter in, e.g., the Friulian, Kurdish, and Romanian alphabets). This is especially hard to detect on a smartphone, where displayed characters are quite small. In response, mobile device 405 attempts to communicate with the website that is associated with the website link and sends an IP packet for delivery to the website (block 433). The security application intercepts the IP packet (block 438), detects that the IP packet was sent in association with clicking on the website link in the SMS message, and, depending on block 443, mobile device 405 or infrastructure computer 410 analyzes the URL of the website link, and may also analyze the SMS message, as part of analyzing the IP packet.

The URL raises a suspicion in, e.g., two ways. First is that the domain name associated with the email address (icloud.com) is similar to a well-known domain name (e.g., icloud.com), and second is that the domain name includes a potentially misleading character, in that the domain name includes an international character that is similar to an English character. Based on these suspicions, mobile device 405 or infrastructure computer 410 determines that the IP packet indicates a threat (block 448/465).

In some cases, a user's pattern of behavior is analyzed as part of analyzing the IP packet. For example, network traffic generated by a user when the user is browsing various websites, running various applications that communicate with remote computers, etc., can be analyzed to determine if the pattern of behavior exhibits anomalous or otherwise suspicious behavior. Examples of suspicious behavior include, for example, sending login ID or password information to an unknown website, accessing a new website that is not related to any previously visited websites, accessing multiple blacklisted websites over a period of time, attempting and failing to log in to a previously visited website multiple times, etc. The analysis can be performed by use of a machine learning algorithm, among others, and can be based on a historic pattern of usage as indicated by historic intercepted network traffic.

In yet other cases, analysis of an IP packet can include analysis by a human being of the IP packet or of any other data associated with the IP packet. For example, a child may access a website by clicking on a URL via mobile device 405, and mobile device 405 may send an IP packet for delivery to the host of the website (block 433). The security application intercepts the IP packet (block 438), and, depending on block 443, mobile device 405 or infrastructure computer 410 analyzes the URL as part of analyzing the IP packet and detects that the IP packet was sent to a previously unvisited website. A determination is made that the child has not visited the website associated with this URL, and the URL is sent to the mobile device of the child's parent or an adult who is supervising the child for review and approval. A determination is made whether the IP packet indicates a threat (block 448/465) based on the response received from the parent or adult supervisor.

In some cases, analysis of an IP packet can include analysis by a policy engine that decides what to do with the packet, such as letting the packet pass through, blocking the packet, modifying the packet, or replacing the packet with a different packet, among others. The policy engine can be part of a privilegeless virtual network interface (PVNI) of an operating system, which can use the policy engine to control flow of network traffic. The analysis of the IP packet can include, for example, the following steps: setup of a PVNI by starting a PVNI privileged daemon, which bridges the data flow that goes from the policy engine(s) to the kernel. Creation of a virtual network interface, e.g., vir0, as well as a routing table policy is performed, so that all traffic coming and going to the target application(s) goes through vir0. As a form of example, in an example Linux system, the PVNI privileged daemon runs as root, and the virtual network interface is represented as utun0, and there is only one instance of this daemon. Finally, the PVNI policy engine daemon is started, which enables use of a user-mode process to inspect the network traffic.

When a determination is made that an IP packet does not indicate a threat (block 450), the security application sends the IP packet (block 453) to destination computer 420, where the packet is received (block 470). Destination computer 420 responds by sending the requested data (block 473) to mobile device 405, where the data is received (block 455) and forwarded to the application that requested the data.

Figure 6:
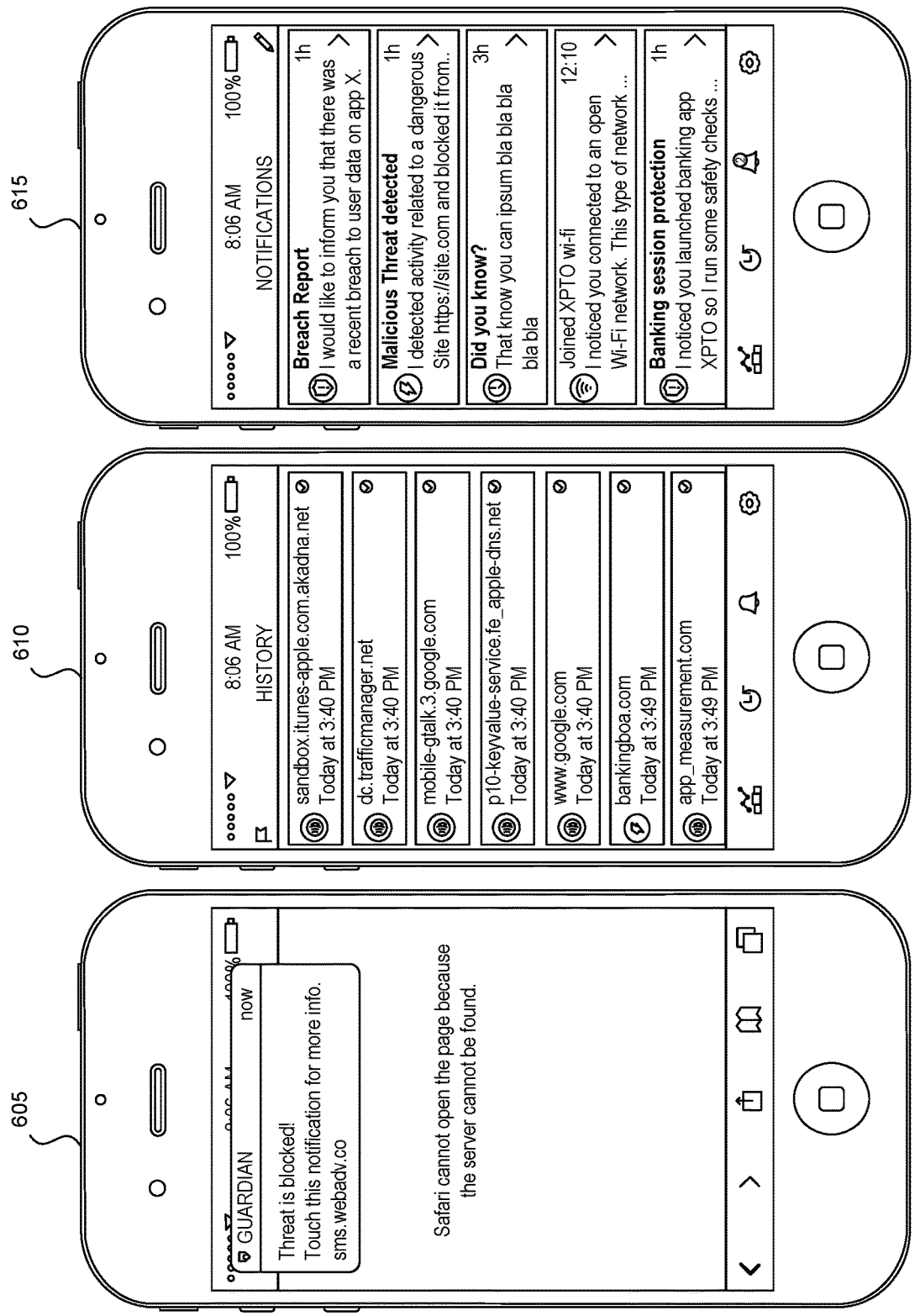
Figure 7A:
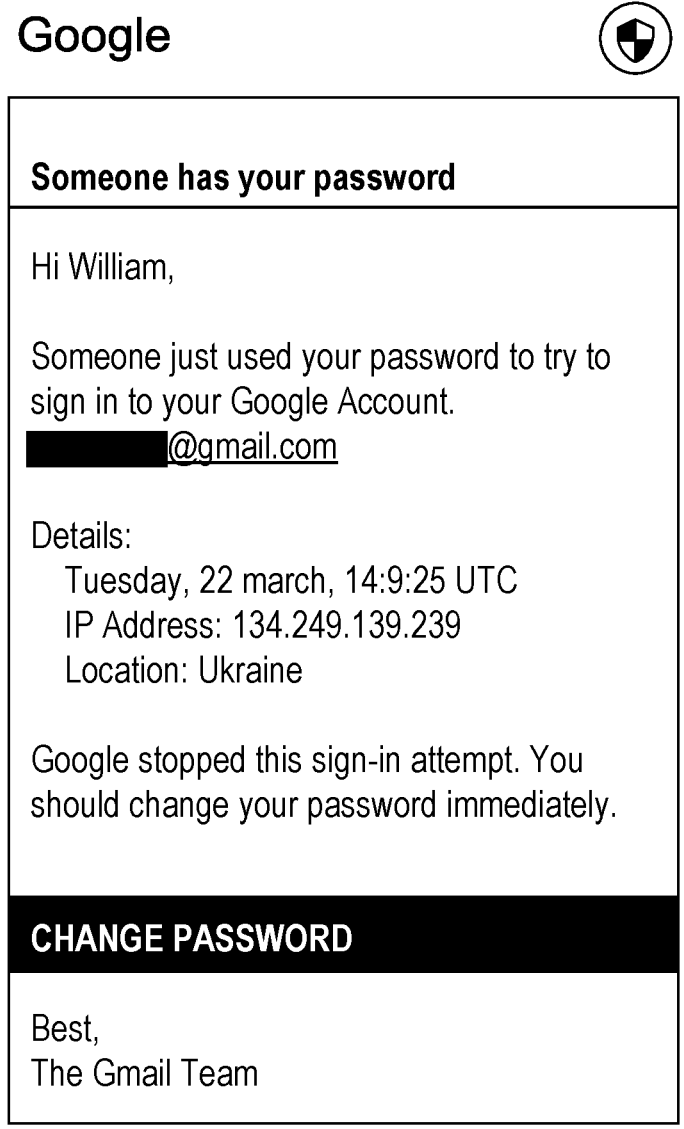
Figure 7C:
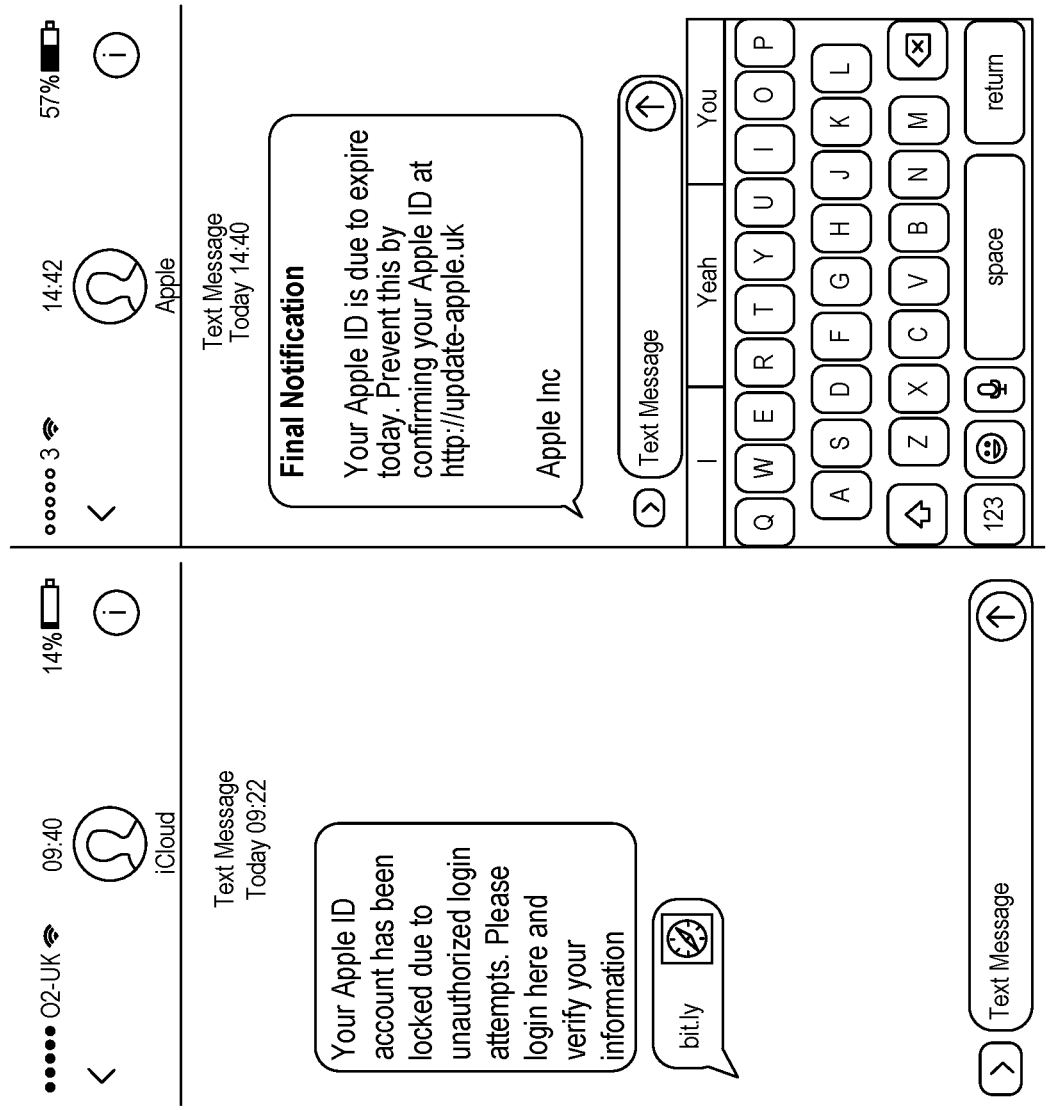
Figure 7D:
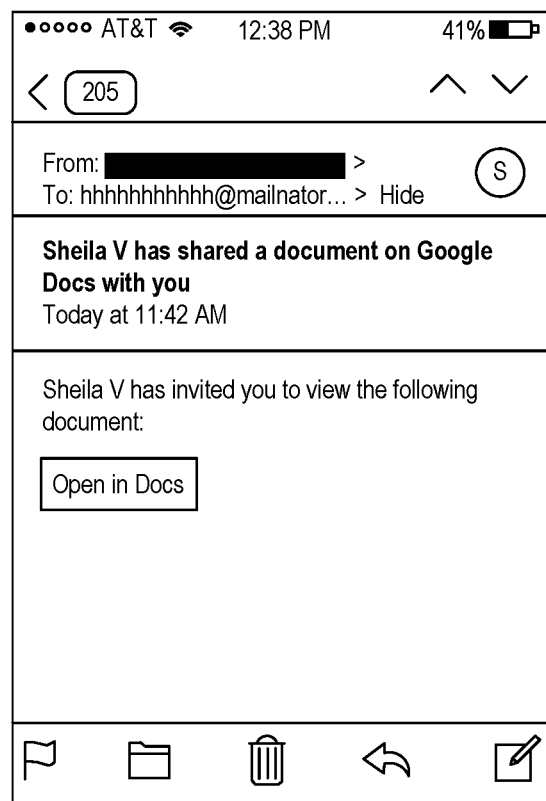

When a determination is made that an IP packet does indicate a threat (block 450), the security application prevents the IP packet from being transmitted (block 458) and displays a message (block 460) on mobile device 405, such as any of the messages displayed on mobile devices 605, 610, or 615 of FIG. 6. In some embodiments, the message displayed (block 460) indicates that a potential security threat was detected and the data access is blocked. In some embodiments, the security application, rather than preventing the IP packet from being transmitted, modifies the IP packet before transmission. For example, the IP packet can be modified to remove sensitive data, such as a login ID, a password, etc.

In some cases, the determination as to whether an IP packet indicates a threat (block 448/465) may take enough time that the user's perception of the performance of accessing remote data may be negatively impacted. For example, a determination made by a remote computer, such as infrastructure computer 410, made based on input from a human being, etc., may take enough time that a user would be unhappy with the performance. In some embodiments, rather than waiting for a determination to be made as to whether an initial IP packet indicates a threat (block 448/465), the initial IP packet is transmitted to a network for delivery to destination computer 420. Subsequent related IP packets, also sent for delivery to the destination computer (block 433) before a determination is made as to whether the initial IP packet indicates a threat, are similarly transmitted to the network for delivery to destination computer 420. Once a determination is made whether the initial IP packet indicates a threat (block 448/465), and if the determination is that the initial IP packet does indicate a threat (block 450), subsequently sent IP packets are prevented from being transmitted to the network for delivery to destination computer 420 (block 458), and subsequently received data from destination computer 420 is discarded without being forwarded to the requesting application.

In some embodiments, rather than determining if an IP packet indicates a threat and preventing the IP packet from being transmitted, the security application can determine if an IP packet indicates data that is particularly sensitive from a security standpoint, such as data transmitted via a banking application to a bank server (e.g., the banking application executing at mobile device 405 and the bank server being destination computer 420), can create a VPN tunnel from mobile device 405 to destination computer 420, and can securely send the data from mobile device 405 to destination computer 420. This can protect against, for example, a rogue WiFi network intercepting data sent between mobile device 405 and destination computer 420.

In some embodiments, rather than determining if an IP packet indicates a threat and preventing the IP packet from being transmitted, the security application can monitor the IP packet to determine application usage. For example, the security application can determine which applications executing at mobile device 405 are most commonly used by a user. This application usage data or statistics can be delivered to people or entities that are interested in the usage data, such as makers of applications, advertising companies, etc.

In some embodiments, rather than determining whether an IP packet indicates a threat, techniques disclosed herein are used: to detect and prevent trackers, such as SDK-based mobile tracking software, an example being a "hot-mic" SDK; collection of usage statistics based on network traffic patterns, such as detection and measurement of which applications are being used and for how long; detection and measurement of in-app purchases generated by applications; detection and measurement of ad impressions and ad networks used by applications; detection of ecosystem components (e.g., APL SDKs, Ad Network SDKs, Monetization and Growth SDKs, etc.), such as those used by a particular application; tracking bandwidth usage of a shared data plan, such as for personal versus corporate usage; establishing bandwidth limits on non-corporate applications on corporate devices; parental control technology for parents to track, control, or limit their children's use of applications or web browsers on a device; to implement a real-time reputation scoring system on a device, such as: SSL certificate reputation, inspect X509 certificates in real-time, and provide a reputation score in order to prevent access to fake or ill reputed sites; ASN/IP reputation, inspect connections to IP address ranges in real-time and provide a reputation score for the destination IP in order to prevent unauthorized access to C&C servers of known malware, spyware, and ransomware; domain reputation, inspect DNS requests in real-time and provide a reputation score for the domain in order to prevent unauthorized access to C&C servers of known malware, spyware and ransomware; application reputation, by inspecting some or all DNS, IP, and SSL communications, our system can detect application usage by fingerprinting resources of the application, and leveraging this unique potential, our system can then provide a reputation score in real-time for the application that is active.

Figure 8:
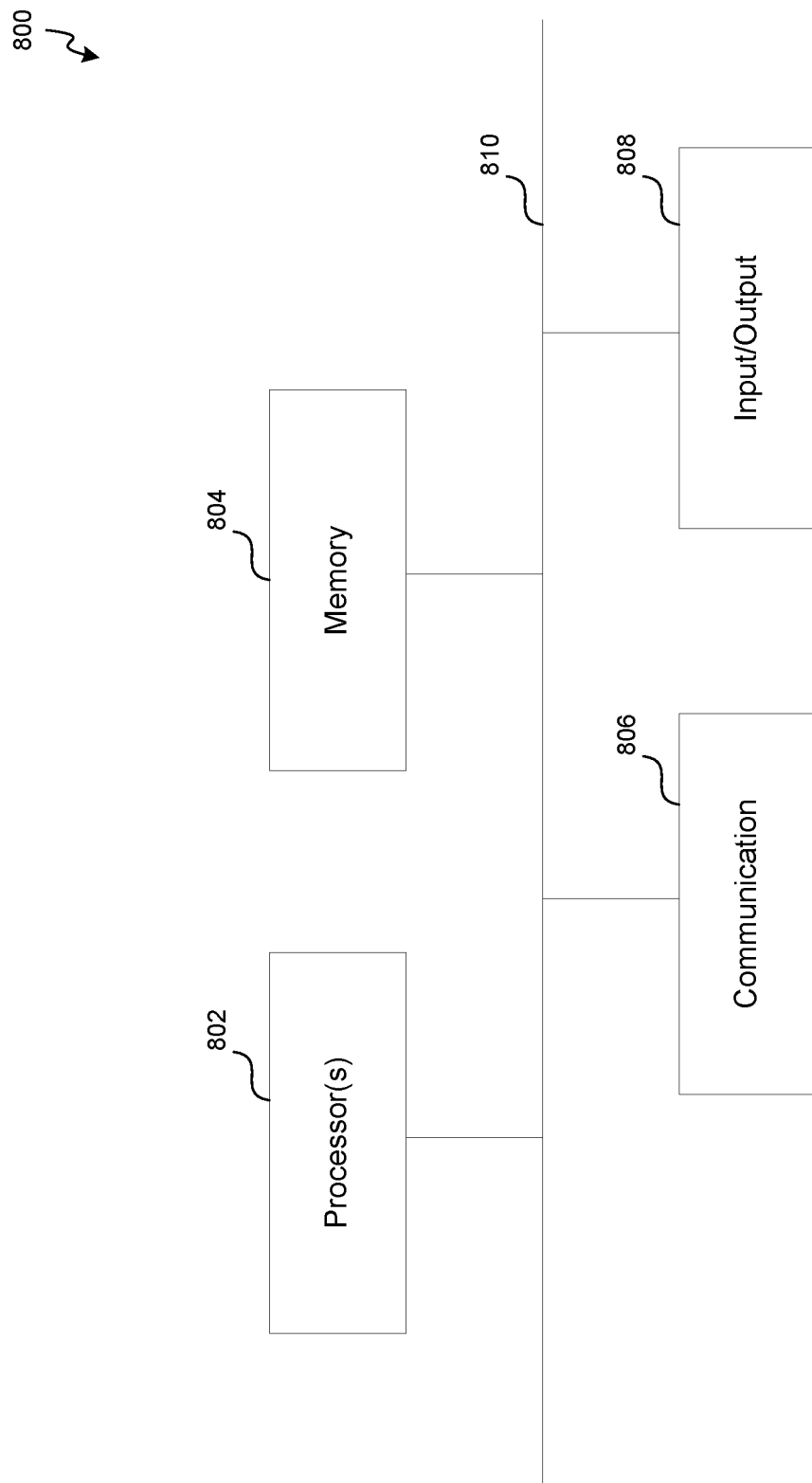
FIG. 8 is a system block diagram illustrating a processing device in which at least some operations described herein can be implemented, consistent with various embodiments.

FIG. 8 is a high-level block diagram illustrating an example of a processing system in which at least some operations described herein can be implemented, consistent with various embodiments. The processing system can be processing device 800, which represents a system that can run any of the methods/algorithms described above. For example, processing device 800 can be any of devices 125A-N, 130A-N, 155A-N, or 185A-N, firewalls 120, 150, or 180, mobile device 405, infrastructure computer 410, server 415, or destination computer 420, among others. A system may include two or more processing devices such as represented in FIG. 8, which may be coupled to each other via a network or multiple networks. A network can be referred to as a communication network.

In the illustrated embodiment, the processing device 800 includes one or more processors 802, memory 804, a communication device 806, and one or more input/output (I/O) devices 808, all coupled to each other through an interconnect 810. The interconnect 810 may be or include one or more conductive traces, buses, point-to-point connections, controllers, adapters, and/or other conventional connection devices. Each of the processors 802 may be, or include, for example, one or more general-purpose programmable microprocessors or microprocessor cores, microcontrollers, application specific integrated circuits (ASICs), programmable gate arrays, or the like, or a combination of such devices. The processor(s) 802 control the overall operation of the processing device 800. Memory 804 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 804 may store data and instructions that configure the processor(s) 802 to execute operations in accordance with the techniques described above. The communication device 806 may be or include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 808 can include devices such as a display (which may be a touch screen display), audio speaker, keyboard, mouse or other pointing device, microphone, camera, etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 800 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing a separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems, and devices described above may include additional, fewer, or different functional components for various applications.

III. Example Edge Gateway

FIGS. 9A-9D illustrate various aspects of examples of system architectures that can incorporate various of the technologies described herein, such as a front proxy for enterprise/workload access security. Deployments can be performed on a variety of enterprise infrastructure in a variety of formats (e.g., chef, puppet, or terraform scripts as well as virtual machine/container images). In various embodiments, the Fyde app, via an edge gateway, will transparently route all traffic to an internal service whether that be on a cloud VPC or datacenter. Every access request generated on behalf of the app will be evaluated towards the corporate policy. Any violation will lead to immediate disconnect from service and user will be presented with remediation steps. One example use case is access to Gitlab enterprise by developers (typically AWS VPCs deploy Gitlab instances and Mac laptop endpoints).

In some embodiments, the edge gateway deploys as an app directly from applicable App Stores, whether through MDM provisioning or self-provisioning via enrollment emails. The Edge Gateway intercepts all network traffic directly on the device (whether mobile devices, laptops, a combination, etc.). It extracts metadata and netflow information from all in/outbound traffic. A mix of whitelisting, blacklisting, expert knowledge, lexical analysis and statistical models can variously be used to block threats in real-time on the device.

IV. Access Proxy Platform

A. Zero Trust

1. Introduction

From a philosophical standpoint, Zero Trust represents a reexamination of the understanding of Trust in the context of Information Security and, more broadly, a better representation of its real-life counterpart. To this end, Trust can be considered as a dynamic relationship that grants privileges based on the belief that the trusted subject will behave according to certain expectations. The continuous evaluation of the subject's behavior and changing expectations cause this relationship to be: conditional, temporal, contextual, and, sometimes, transitive.

2. Conditional Trust

The conditional nature of Trust is often referred to in an Information Security context as Authentication and Authorization: depending on the identity of the subject they are allowed to do X or Y. For this to work though, strong assurances are needed about the identity of the subject. That is the Authentication piece. The current state-of-the-art in this area is called Multi Factor Authentication (MFA) and it implies that a subject can prove its identity by combining multiple credentials from different factors or categories. Usually a subject is required to present something it knows, like a PIN or password, and something it has, like a security key or a specific mobile device. An example of a possible third factor is biometric information.

An attacker able to impersonate a subject violates our assumptions of trust, as it is granted (i.e., Authorized) privileges that it is not entitled to. All properties of a trust relationship are interlocked and they intend to safeguard from, and contain, both attackers and trusted subjects that become malicious (i.e., an insider threat).

3. Temporal Trust

Temporality is another fundamental Trust property: trust can be revoked. In its crudest form, Trust's temporality is bounded by the creation and deletion (or disabling) of a subject's identity, and it is still the case today in most systems: if an account is compromised, the first thing to do is to disable it and start forensic procedures. Over time, trust relationships have became more nuanced and time sensitive: passwords have expiration dates, X.509 certificates have notBefore and notAfter fields, and OAUTH2 tokens needs to be refreshed periodically. Temporally binding Trust provides a controlled exposition window in which an attacker can impersonate a subject and utilize its privileges. The assumption is always that when the trust relationship is reasserted, the attacker won't have access to the newly created relation, or that such reassertion will catch the attacker as an anomaly in the system (i.e., an attacker trying to utilize a privilege by presenting an expired token).

4. Contextual Trust

A more recently introduced property of Trust in terms of Information Security is that Trust is contextual. This property says that what matters about a subject, in terms of granting a privilege (i.e., trusting), is not just its identity and the associated authorization lists defined by the privilege grantor, but also the context in which the subject is operating. This property marries in a way completely theoretical concepts with experiential sciences like Situational Awareness and Operational Security. As an example, the Trust level assigned to a subject operating from its desk inside the headquarters of the company it works for, using a company-provisioned wired desktop computer, is different than if the same subject, in the same time period, decides to operate from a pub in a foreign country, using its own laptop sporting an operating system that was last updated two years ago and the pub's public WiFi. This example highlights the importance of continuously reasserting trust relationships, as both the expectations from the privilege grantor and the context of the subject, including physical and logical components, are highly dynamic and can change unexpectedly.

Ways to address the problem of contextually-aware Trust, if only partially, include:

Through legal agreements or government regulations that bar subjects from accessing resources if certain conditions are not met.

Using Network Security solutions (e.g., VPNs) to overcome the trust issues related to unknown, unmanaged, and potentially malicious networks.

Providing Endpoint Security Solutions (e.g., Antivirus) to employee-owned or employee-issued computers to ameliorate cases of malicious software running in tandem to business-critical applications.

Enforcing security hygiene when accessing a corporate WiFi or wired network using a Network Access Control solution that will require certain measures to be taken (e.g., installing an AV), before allowing access to the network (usually a coarse all-or-nothing approach).

All of these are partial solutions: they can only be enforced in a corporate environment or they protect the corporation only for certain types of threats, and combining them doesn't actually cover the entire scope while increasing the complexity and attack surface of the final solution. As described in more detail below, a Zero Trust paradigm allows for the creation of a more nuanced, fine grained, and fully enforceable solution.

5. Transitive Trust

The last property of Trust to analyze is its transitivity, just to spell it out: if A trusts B, and B trusts C, shall A trust C?

When considering the case of end-user access to enterprise resources, it is usually assumed that the subject doesn't have a right to delegate such Trust to a 3rd party. Arguably, this is still done implicitly by means of several under-the-hood integrations between cloud services, but to the extent that such integrations are handled internally as service-to-service trust relations, the end-user subject still doesn't delegate trust.

6. Zero-Trust Paradigm

The Zero-Trust paradigm describes a system that doesn't assume a trust perimeter and instead continuously reevaluates its Trust relationships, e.g., in a conditional, temporal, and contextual way. The name Zero Trust comes from the notion that a system shouldn't assign implicit or arbitrary trust to any part of a network. Concepts such as a DMZ, a secure v.s. insecure interface, or an intranet do not apply anymore in a Zero Trust network, where all connections are considered hostile unless they are properly authenticated and authorized.

One aspect in fulfilling this description is to have a strong identity system, e.g., tying a subject identity, identified using MFA, with a trusted device, identified using a mix of a cryptographically secure device identifier that cannot be extracted nor cloned, and hardware unique identifiers like hard drive or motherboard serial number. A non-clonable secure device identifier can be achieved by using the embedded crypto-processors found in modern PCs and mobile devices. These specialized processors allow for the creation of private-public key pairs where: the private key is calculated inside the processor itself and cannot be extracted, and all cryptographic operations are also calculated in the crypto-processor. Once a strong identity is in place, it is possible to achieve proper Authorization policies based on the subject's membership to different groups as required by the corporation.

A second aspect is to shift all network perimeter access control rules to an "Inventory-Based Access Control" system. This means using information gathered about the devices to infer trust based on the state of such devices and other features from the subject. A device that hasn't applied all Operating System (OS) updates, or a subject accessing a resource from a new location are examples of situations that help infer a lower trust level (i.e., high risk). Trust inference is not a binary decision procedure but one that provides very granular degrees of trust that an Application or Project Owner can use to define what is an acceptable level of risk for them. An Access Control Engine provides an example of contextual and temporal Trust that is in charge of trust inference, continuously re-evaluating the trust level of all subjects when faced with new information, which is digested from multiple data sources.

A third aspect is to remove all concept of a network trust perimeter. This means that a subject accessing a corporate resource should have the same experience accessing it from any network, internal or not, so long as they comply with the resource Access Policy rules. To enforce such rules though, all resources need to be held behind a network proxy that acts as a broker. This broker has the ability to assert the subject's identity and query the Access Control Engine to know if the subject's group membership, device used, and contextual factors about both (device and subject) are sufficient to allow access to the resource.

From a user experience point of view, another aspect for a successful Zero Trust solution is to provide appropriate remediation steps, allowing a non-compliant subject to effectuate whatever changes are necessary to regain access to the resource requested. A mechanism for querying the Access Control Engine to determine what changes are needed should be provided. This is a very security sensitive task, as it could result in an information leak that gives a recipe to an attacker about how to access resources.

7. Corollaries a.—The fact that all access to internal resources is controlled by a single, logical, point of entrance means the system includes a good spot for doing auditing. This centralized visibility also allows for analysis of traffic trends, is useful for optimization and reliability, and provides an unparallelled tracing capability (e.g., useful as a forensics and DLP tool). It is also possible to integrate this analysis into the Trust inferring process, as another component to factor into the trust level of a subject.

b.—There is a distinct differentiation in terms of solutions and the problem definition in the commercial space when a Zero Trust network is considered as a service-to-service connection versus a subject resource access solution. When considering the former, the pairing of devices to subjects changes to pairing compute nodes to applications, and instead of considering access to a corporate resource, it becomes a peer-to-peer connection, where the receiving side is also a node-application pair.

c.—Zero Trust moves the security perimeter into the endpoint to achieve the vision of considering all networks as equally untrusted. This means that asserting the security of all endpoints becomes critical; the more nuanced and informed decisions about device-level security are, the tighter our global security posture will be.

d.—A sometimes overlooked consequence of centralizing access policy, authentication, and transport security is that the internal resources are liberated from having to handle such things, decreasing the attack surface and total complexity of the corporation's systems. This requires that the access broker proxy relies identity and trust level information about each stream received to the resource accessed.

e.—Considering every corporate network as equally untrusted changes the attacker's dynamic by diminishing the value of single point breaches. A rise-and-repeat format of attack found in the wild is to phish or otherwise compromise a single employee in a company with the intention of using him/her as a proxy into the internal network and from there into more important targets, something usually called "lateral movement." In a truly Zero-Trust network an attacker acquires as many privileges as the subject compromised, but no more, since a lateral movement in such situation is as hard as it was before compromising anybody.

f.—In a complete Zero Trust network every stream flowing is validated, and as such, expected. This gives a strong signal to other network security monitors that could flag and further analyze such abnormal flows. It also limits the opportunities of data exfiltration from a compromised corporate resource.

8. Conclusion

The Zero Trust paradigm helps Information Security practitioners rethink one of the hardest and longest standing problem in corporate security: internal network security. By assuming all networks as equally untrusted, the same level of scrutiny over transport security and authentication is applied to all resources. The net effect of this change is that all traffic in a corporation ends up having very strong assurances about confidentiality, authenticity, and initiator's identity.

As it happens with many other security proposals, mobile devices represent a unique challenge in terms of architecture and implementation. From an architecture point of view, mobile devices are naturally roaming and that needs to be accounted in the design of a mobile-friendly solution. Implementation-wise, mobile operating systems have all embraced a strict Application-centric approach, meaning that tasks naturally belonging to the OS are properly guarded and off-limits for third party applications. This OS design decision limits the scope of action and visibility of security agents running on such devices and require smarter approaches to collect relevant attributes used to infer trust.

Various embodiments of the mobile interception agent described throughout the Specification (e.g., used for anti-phishing and DNS interception) include sidecar proxy functionality. This is a separate process that handles networking, transport security, and authentication, running along an application that requires such services and delegates them to the proxy while accessing corporate resources. Additional detail is provided below.

B. Access Proxy Platform Introduction

Described herein are embodiments of a system to provide secure access to resources in accordance with various goals of a Zero Trust paradigm. Example implementations are mobile first, meaning they cope with the necessities of a roaming device that will continuously switch between an internal WiFi, LTE/4G, 3G, a public WiFi, etc. Following the premises of Zero Trust, each connection to a resource is authenticated individually, and to that end a strong device identity is required. In an example approach, resource access is tied to an authentication 3-tuple that includes: Device, Resource, and Access Policy. This authentication is verified by an access proxy that brokers the connection to the actual resource.

As used herein, "Device-User" (sometimes referred to herein as just a "Device") encompasses a one-to-one relationship between a device and a user, as is the case for most mobile operating systems today. Even where a physical device can be considered multi-user (e.g., on a wired desktop), in various embodiments a separate device identity and cryptographic proof is generated per user of the shared physical device. Accordingly, a "Device" refers to the Device-User pair irrespective of whether the device has one or multiple users.

Transport of packets to/from an origin (e.g., Device) and a resource (e.g., residing in a corporate server) comply with the cryptographic triad of Confidentiality, Integrity, and Availability. To this list is further added Authenticity (CIAA), as the case of mutually authenticated connections using device-specific identities is considered. While the TLS cryptosystem, in its mutually authenticated variation (aka mTLS), is generally described herein as being used in various embodiments, other cryptosystems (e.g., complying with these properties can also be used). From an integration point of view, the approach described herein is to act as a transparent proxy applied to all entitled network connections that require access to protected resources. As such, an application using such a secure access proxy is unaware that the transparent proxy is encrypting and routing its packets.

Each resource served through the proxy has an associated policy that defines constraints a connection must meet to be accepted and proxied forward. This policy includes attributes about the Device that originated the session, the authenticated user trying to access the resource, the network itself (e.g., originating network block), and the resource in question. Policies build upon themselves using functional-style statements to better serve complex configurations owned by multiple stakeholders. Also, support of the creation of global policies that apply to all incoming connections, and also more specific per-resource constraints. Signals from multiple sources can be coalesced to obtain a broader understanding about the state and context of a Device-User. Some will be reported from the device itself, others from network appliances, and others manually through IT/SecOps operators. Regardless of source, together these signals provide a comprehensive list of attributes that empower administrators to make better access decisions.

All elements involved in the authentication 3-tuple (Device, Resource, Access Policy) can change or be revoked at any given time and such change trickles down and becomes effective to currently established and future sessions as soon as possible (generally immediately, considering an eventually consistent meaning on "immediate").

C. Access Policy

Access to resources is granted based on trust levels and the user's group membership. The former capture attributes about the device, location, and user behavior, the latter represents a restriction of resources to need-to-know individuals, following the principle of least privilege.

A trust level represents a named collection of constraints that must be fulfilled to access a resource. As such, a Device-User might comply with multiple trust levels at the same time, this means trust levels are not necessarily hierarchical nor super/sub sets. As an example, an organization might allow users to access its mail server from a device that is up to date with OS critical fixes at most one month old, called a "middle tier" trust level, but to access their HR management solution, the device must be up to date within a two business day window, called a "high tier" trust level. In this case, a "high tier" device is also a "middle tier" device, and it will be allowed to access both: the email and the HR server. In other cases, two levels might be comprised of strict disjoint sets of attributes, yet both could be satisfied by the same device.

These trust level correlations are dynamically updated in an Access Policy Engine based on information reported by devices, telemetry collected from 3rd party sources (i.e. network equipment and other security products), and inferences created through machine learning or other applicable techniques.

In some embodiments there are two types of access policies: Global policies and Per-Resource policies. Global policies are applied over all connections received by an access proxy, while Per-Resource policies are only applied to the specific resources they name.

These policies and the Domain Specific Language used to describe them are an abstract declarative representation of the constraints required to comply with a trust level. These are later interpreted and compiled into technology- and network-specific rules by the Access Policy Engine. A resource access policy does not require knowledge about the infrastructure that supports it, meaning that if such infrastructure changes, the policy should still be valid. This decoupling between Access Policy and Infrastructure empowers Application Owners to define their own rules according to business needs, without requiring coordination with the Infrastructure team.

D. Access Policy Engine (APE)

The Access Policy Engine is a logic module that evaluates the trust state of a certain Device-User by applying the prescribed Access Policy rules to a set of telemetry collected from devices itself, third party sources, and secondary data, e.g., produced through machine learning or other techniques. It is considered the root of trust used to make an access determination.

The following are two example evaluation scenarios to consider with regards to policy enforcement:

Case 1: Policy is evaluated at access-time, and cached for a certain amount of time.

Case 2: Policy is evaluated when new telemetric information is provided (pre-calculated) and the result is shared with the proxies serving the devices that have changed.

In case 1, an Access Proxy takes care of policy evaluation itself, as part of an in-line flow to connect to an internal resource. The Device can also request access to a resource directly from the APE and relay an authorization token to the Access Proxy as part of the connection's initiation.

In case 2, the APE continuously re-computes the trust levels of all devices whenever a new (i.e., different from current) piece of telemetry information is reported, keeping the Device-User inventory database always up to date with the latest information collected. In this scheme, a central cluster of APEs can publish updates about trust levels as applied to a given Device and Resource to the Access Proxies controlling such Resources that have recently interacted with such Devices.

E. Policy Remediation Engine

In various embodiments, this Engine is in charge of providing services for querying remediation steps necessary to comply with an Access Policy. In an example implementation, this works as a step-by-step simulation of an actual policy determination that reports back the faulty constraints. This module has security implications, as it could potentially be used as a source of information in an orchestrated multi-step attack. In such attack, a malicious actor could potentially acquire the constraints required to gain access to a protected resource. Various example countermeasures for lowering the risk exposure are described in more detail below.

F. Resource Access Proxy (RAP)

A Resource Access Proxy acts as an enforcer of the Access Policy, using the Access Policy Engine as its root of trust. The RAP is in charge of creating the mutually authenticated secure transport channel between Devices and itself. In essence, it acts as a proxy, or packet forwarder, between a Device and a (set of) backend servers that host the protected Resources. On top of this typical proxy function, it is also able to forward authentication information about the Device-User that is accessing a resource. Such identity forwarding, if properly integrated into a backend service, can replace other authentication methods; bringing a more secure and streamlined user experience. A RAP can also be deployed as a sidecar proxy, that is, as a separate process that takes care of handling all networking and transport security for an internal system that delegates all this needs to the proxy.

In various embodiments, A RAP is not a mandatory element in an access proxy platform. It is possible to integrate other secure transport mechanisms, as long as such mechanisms can relay a proof of possession of the Private Key for the Device-User certificate to the Access Policy Engine and it also honor the results from its policy evaluation. An alternative configuration can, for example, use a TLS VPN that contacts an APE as part of the authentication process. As another example, a custom Linux Pluggable Authentication Module (PAM) module can verify the client's identity and policy compliance before starting an SSH session.

G. Status Reporting

Enrolled Devices periodically report telemetry information required by the Access Policy Engine to make an access determination. Other security solutions and networking equipment also report to this module and its signals are aggregated and exposed as attributes of the Access Policy rules.

This device telemetry can also used by the Policy Remediation Engine to query a knowledge base of remediation steps that a User can use to come back into compliance when access is denied.

H. Example Implementation

1. Generalities

In an example implementation, an X.509 Device Certificate is created upon enrollment and a compact signed message to relay Access Policy authorization to an Access Proxy. The latter is used to authorize access to resources, either through the RAP or another security broker, and the former is used to identify and authenticate connections to Fyde cloud infrastructure or an Access Proxy.

Every organization counts with a CA Root, signed by a Fyde Enterprise Customers CA, that is kept in a per-tenant Secrets Manager inside Fyde infrastructure. This CA is the signer of all Proxy and Device Certificates. The CA Root is the source of trust of the organization and its public key should be distributed as part of a device enrollment process as a form of trust bootstrapping. Fyde's application will confirm that the CA Certificate included in such links is valid and signed by Fyde's CA.

2. Device-User Enrollment

The first step required for establishing trust in an example environment that incorporates techniques described herein is to enroll a Device into the system. The end result of this process is to create a cryptographically strong relationship between a particular device and a user, in a way that it can be used as an identification mechanism for authentication and authorization purposes.

As part of this enrollment, a private-public key pair is created as is an associated Certificate Signing Request containing a randomly generated ID (called deviceID) in the Distinguished Name. The private key is created and kept on the secure enclave of the device, so that it cannot be extracted nor cloned.

The single-use token issued to enroll the device and a CSR of the device certificate are sent to an API that will confirm the token is valid, has not expired, and it hasn't been used before. Then, depending on the security requirements of the organization, the device will be left on a queue of devices pending authorization, or it will be considered enrolled automatically. In both cases, the API will reply with a signed X.509 Certificate. If a device is left pending authorization, it means the rest of Fyde's API won't be accessible until the device has been authorized.

The single-use tokens described here can be transformed into multi-use tokens by adding a reference counter to it (i.e., number of available uses for a token) and an expiration date. A token is bound to a user entity. A use case that a multi-use token solves is enrolling multiple devices that belong to the same user.

Another form of device enrollment supported is to require the user to provide credentials, through a SAML login screen for example, that match the user for which the enrollment token was issued. In this case, the backend API will confirm, through a signed SAML Response, that all authentication pieces match with what is expected.

Yet another form of device enrollment is to use an already enrolled device as a voucher for the new device. In this configuration a user that already counts with an enrolled device can add new devices to its user by asking to enter into the new device a form of short-lived token generated on the device already enrolled.

In a situation where a secure deployment mechanism is available where devices are mass deployed, as it is possible on supervised Apple devices, this Device Certificate creation and enrollment can be fully automated. Some examples of such mechanisms are Apple's VPP Device Assignment and IETF proposed ANIMA networks.

3. Resource Access Proxy Enrollment

A Resource Access Proxy enrollment process is non-interactive (i.e., it can happen without operator intervention whenever needed).

4. Access Policy

A trust level can be thought of as a function that takes as parameters all attributes related to a Device-User and return a Boolean value.

This simplified Domain Specific Language allows for creation of an access policy library that can be reused by multiple stakeholders in a large organization. Furthermore, each trust level itself can be invoked by another one to produce more complex scenarios. The minimal set of operations needed are Boolean algebra, inequality comparisons, and n-tuple lookup (set theory included-in operator). The minimal atom sorts required are: bool, string, datetime, number, n-tuple (sort of sorts), CIDR. The in/equality operators semantics need to be defined for every sort. Subexpressions can be defined using parentheses.

This is an example of an access policy:

high_level:=(last_os_update<=2 days && !eol)||
   (location in ["Palo Alto, Calif., USA", "Porto, Portugal"]
    && passcode_type=="alpha")
super_secure:=(high_level && !jailbroken)

a. Device-User Trust Level Attributes

This is a non-definitive list of supported device and user attributes.

Device Related Attributes:
os_version: BCD encoded. integer.
type: string. "phone, tablet, pc"
os_up2date: datetime.
eol: bool. (End-Of-Life)
same_location: datetime.
location: string. City, State, Country.
jailbroken: bool.
passcode_type: string. "none", "pattern", "numerical", "alpha"

Network Related Attributes:
src_ip: CIDR notation.
last_device_reporting: datetime.

User Related Attributes:
Phishing_hygene_score: integer.
last_auth: datetime. Last time the user was asked to authenticate this device.

Third Party Attributes:
c_<source name>: (key, type, value)
   b. Access Policy Attributes
   A resource's policy binds a set of allowed Trust Levels to a set of users and groups as determined by the Users Database, effectively combining Attribute-Based Access Control (ABAC) and Role-Based Access Control (RBAC) policies into a single access policy determination.
   5. Protected Resources
   a. Resource Configuration
   A protected resource represents a mapping between a user-facing domain name and an internal host/IP address that is only accessible from behind a Resource Access Proxy. Traffic to this internal host is brokered by the RAP, enforcing User-Device identification and Access Policy before allowing access.
   Described herein are two types of example implementations of a system: One requiring a publicly registered subdomain name and one that doesn't require it. In the latter case, the domain name doesn't need to be registered on any public registrar, as a DNS interception system such as is variously described herein will take care of resolving it to an internal address that works as a marker to identify the resource and initiate the secure tunnel to the Fyde Proxy. The former case uses publicly registered domains mapping to per-tenant static internal IP addresses that act as the markers described before. This avoids the need for a DNS interception mechanism. In this setup, a company would reserve a subdomain and delegate it to Fyde DNS servers, which will resolve the resource names to the marker addresses without having to intercept DNS resolution. For example, a ".fydecustomers.com" subdomain can be provided where a tenant could register "Gitlab.tenant.fydecustomers.com" as the publicly accessible domain name for an internal resource.
      i. Host Wildcarding, IP Networks
   In some cases, it is desirable to define a single resource that exposes multiple hosts, since those are multiple representations of a single logical entity (e.g., worker nodes in a cluster) or there is a business need to expose an entire range of hosts under the same policy and producing an inventory of the hosts is either unfeasible or an unacceptable administrative burden.
   One solution for this use case is to allow wildcards in the resource definition. As described previously, a resource is a mapping between a publicly accessible host name to a privately accessible one. It is possible to replicate the wildcarding between the public and the private hosts. As an example, an organization could have a number of cluster nodes with a format like: node1.websvc.internal, node2.websvc.internal, etc., that are dynamically added and removed as the service load requires. The organization desires to expose an administrative interface to securely access the nodes (e.g., SSH over TCP port 22). One option is to define a Resource with a wildcard public host name of "*.websvc.internal" mapped to a wildcard internal name "*.websvc.internal", allowing access to TCP port 22 to all users that are part of the DevOps group and have non-jailbroken devices. Another option is to create a mapping using different suffixes, for example using the public name "*.websvc.company.com" and internal name "*.websvc.internal". This is useful when tunneling an HTTPS service that has a public CA certificate, since it is not possible to obtain such certificates for internal host names.
   For all domain accesses, the network interception client would try to match the received domain against the registered resources. If that fails, it would split the domain name and start removing labels one at the time until it matches a wildcard domain name or it runs out of labels. This method is called longest-suffix-match and it allows for the use of multiple wildcards at the same time with a clear logic that can be easily explained to an administrator.
   For example, an organization could define the following resources:
      Resource 1: *.dev.fyde.local
         Matches: web1.dev.fyde.local, monitor.dev.fyde.local.
         Doesn't match: qa.dev.fyde.local, redis.prod.fyde.local.
      Resource 2: qa.dev.fyde.local
         Matches: qa.dev.fyde.local (exact match always takes precedence).
         Doesn't match: anything else
      Resource 3: *.prod.fyde.local
         Matches: redis.prod.fyde.local, web1.prod.fyde.local
         Doesn't match: web1.dev.fyde.local, wiki.fyde.local
      Resource 4: *.fyde.local
         Matches: wiki.fyde.local, admin.fyde.local
         Doesn't match: redis.prod.fyde.local, git.fyde.local
      Resource 5: git.fyde.local
         Matches: git.fyde.local (exact match)
         Doesn't match: anything else
      ii. Port Ranges
   Another feature to avoid an unnecessary administrative burden is to be able to define allowed Resource ports using port ranges. That is, to define a list of ports as an incrementing sequence from a starting number to a final one instead of having to iterate over all of them. This is also possible, using compact Resource Authorization Tokens, since those return a list of all the ports a Device is allowed to access.
   b. Resource Authorization Token (RAT)
   When a Device intents to access a Resource, it first needs to contact the Access Policy Engine to request a Resource Authorization Token. This is an authenticated message that authorizes a Device to access a Resource during a pre-configured limited amount of time. This is a particularly sensitive structure that needs to cope with multiple security considerations. This section describes an example format for a token. Other tokens can also be used as applicable.
   The authorization token includes enough information to canonically represent the Device accessing a Resource and the Resource being accessed. It also assures, cryptographically, which entity granted this authorization.
   An example minimal implementation covers the following fields and security premises:
Message={
   'deviceId': <deviceId for the device this authz is issued>,
   'latestCertHash': <SHA-256 of the device X.509 certificate>,
   'resourceId': <resourceId for the resource this authz is issued>,
   'ports': <list of ports allowed under this authorization>,
   'resourceHash': <hash of the current configuration for a resource>,
   'partialHostHash': <SHA-256 hash of the partial host portion of a wildcard domain access>,
   'notBefore': <start date for the validity of this token>,
   'notAfter': <end date for the validity of this token>
}
Token=Sign(Message, TenantPrivKey)
   An example implementation using off-the-shelf cryptographic constructions, like JSON Web Token (RFC7519) is as follows:

```
Token=JWT({
    'iss': <tenantId>,
    'aud': <proxyId>,
    'nbf': <notBefore>,
    'exp': <notAfter>,
    'device_id': <deviceId>,
    'device_cert_hash': <latestCertHash>,
    'ports': <ports>,
    'resource_id': <resourceId>,
    'resource_hash': <resourceHash>,
    'partial_host_hash': <partialHostHash>
}, TenantPrivateKey)
```

The audience field of the JWT points to the Proxy ID to assure that this token cannot be utilized on a different proxy, and the signing using the Tenant Certificate assures the resource access proxy that this authorization was issued by a valid entity.

Another point to take into consideration is the inclusion of the 'latestCertHash' field. This field assures a match between the device certificate used to request the authorization and the one that effectuates the connection to the access proxy. An attack that this check thwarts involves a leaked Device Certificate that is still valid but not the most currently issued. Even if an attacker would succeed in impersonating a device and re-issuing a new certificate for it, the real device would notice immediately that was denied access and a security event would be filed into the auditing system.

The 'resourceHash' field contains an opaque value that represents the current configuration for a resource from the point of view of a centralized Access Policy Engine. This field allows for deferring requesting updated resource lists in the Resource Access Proxies unless the resourceHash doesn't match or the resourceID is not known to the Proxy. The RAP still considers the Access Policy Engine as the source of trust for resources, so if after updating the resource from upstream the hashes still don't match, the connection is denied and token considered invalid.

The 'partialHostHash' is a SHA-256 of the portion that is usually masked behind the wildcard in a wildcard domain access request. This is required to make sure the authorization token matches what is later sent in the Transport Header. For the case of IP Network resources, the equivalent of a partial host is a string representation of the IP host with all the network bits masked as 0. For example, if the network is defined as 10.10.0.0/24 and the host is 10.10.1.2, the string to hash would be '0.0.1.2'.

c. Transport Header

In various embodiments, to provide all routing and identifying information required to start a new tunneled connection to a resource, such connection is started with a custom Transport Header such as is defined in this section.

This header allows a connection to be multiplexed into multiple internal resources without leaking any details of the Resources that a Device is accessing. The Transport Header can be sent to the RAP encapsulated inside a mutually-authenticated TLS connection, so any confidentiality guarantee is granted under the assumption this mTLS connection cannot be eavesdropped by an attacker.

In an example embodiment, the Transport Header is defined using a Protobuf 3 message that encapsulates all the routing details that a RAP would need to compute the final internal destination that a Device is trying to securely access. An example is as follows:

```
message TransportHeader
enum Protocol
    TCP=0;
    UDP=1;
    HTTP=2;
}
uint32 version=1;
Protocol proto=2;
string partial_host=3;
bytes address=4;
bytes resource_id=5;
uint32 port=6;
string encoded_authz_token=7;
}
```

This message supports multiple use cases that are, in some cases, mutually exclusive. One of the benefits of Protobuf 3 is that the unused fields are simply not encoded in the final message, meaning they do not take any extra space just by being defined there.

i. General Fields

This section describes fields that are always present in a Transport Header message.

version: Used to negotiate the format of the message between the Device client and the RAP that receives it.

proto: Describes the protocol that is being tunneled (e.g., TCP, UDP, or HTTP).

resource_ID: The ID of the Resource attempted to be accessed, as received by the Device client from the Management Console. It must match the ID for which a RAT was issued.

port: TCP or UDP port for the connection being established.

encoded_authz_token: Resource Authorization Token, as received from the APE.

This will handle the initial authorization for the connection. If a resource is already authorized, this field is not sent.

ii. Exact IP Address or Domain Match Resource

When a Resource is accessed using an exact IP address or domain name match, that is the case when a Resource is not defined using wildcards, and it doesn't need to send any extra fields. The fields present in the General section have all the routing information required to compute the internal host and port to connect.

iii. Wildcard Domain Resource

When a Resource is defined using wildcards, it needs to send the portion of the domain name that is not part of the base suffix of the Resource. For example, if a wildcard Resource is defined as "*.dev.fyde.local" and a Device wants to access "websvc.dev.fyde.local", it needs to send the "websvc" portion of the domain name. This is sent inside the Transport Header "partial_host" field. After reception, the RAP will concatenate this partial host information with the internal suffix provided by the Management Console in the Resource object.

iv. IP Network Resource

When a Resource is accessed directly using an IP address but the Resource is defined as an IP Network (the equivalent of a domain name wildcard but for IP addresses), the Transport Header needs to include the "address" field. This field is defined as an array of octets and should contain the IP address in network order with the network bits removed. For example, if an IP Network resource is defined as 10.10.1.0/24 and a Device accesses the IP Address 10.10.1.123, it would send the octets 0, 0, 0, 123 in the "address" field. This field is then logically OR to the IP Network described in the resource as received from the Management Console in the RAP and this final reconstructed address is used to start the connection on the internal leg.

This mechanism of splitting host vs. network address allows for the creation of network mappings where the external vs. internal leg are different networks (of the same size). For example, a Resource could be defined as 10.0.0.0/24 on the external leg and 192.168.0.0/24 on the internal leg, by sending only the host portion and then applying an OR with the network portion. This remapping to a new IP network is supported efficiently.

d. Resource Access Flow

This section describes example steps that a Device performs to establish a connection to an internal Resource.

i. Preconditions

1) A tenant called 'Example Tenant' with Tenant ID '1234-1234-12341234'.

2) A Resource called "git.fyde.local" already added into the management console of the tenant, mapped on the internal leg of the proxy to a git server. Resource ID is '2222-2222-22222222'.

3) A Resource Access Proxy (Proxy Id 8888-8888-88888888) deployed as a gateway to the git server. This server has a public facing interface that can be accessed from the Internet and a private interface that can reach the internal resources.

4) A user called 'Alice' has been added to the system and has enrolled a device. Device-User identifier is '4444-4444-44444444'.

ii. First Access

1) Alice tries to execute a command line git operation on her device, which triggers a network communication to the git server "git.fyde.local".

2) The device DNS resolver asks for the corresponding IP address of this domain. The network interception mechanism receives the resolution request and injects a reply, pointing that domain to an internally accessible marker IP address that represents this particular resource, such as "192.0.2.2".

3) The git process opens a new TCP connection to 192.0.2.2 port 9418. The network interception stack replies to it and starts a mutual-TLS connection to the proxy that is protecting this resource.

4) In parallel, a request is made to the Access Policy Engine to grant permission to this resource. This request contains the Device-User identifier (444-444-44444444), the Resource identifier (2222-2222-22222222), port, and device specific attributes necessary for policy evaluation.

5) If the APE decides that access is granted, a Resource Authorization Token is returned granting access to it for a configured amount of time, for example 15 minutes. This token contains all the identifying pieces of information described in the Resource Authorization Token section and time constraints that describe the span while this authorization is valid. If access is denied, it will instead return a list of actions the device needs to do to come back into compliance.

6) The Resource Access Proxy associated with this particular resource verifies the client certificate presented at point 3 and the network interception client running on the Device verifies that the server certificate presented by the proxy is valid and that it represents the appropriate tenant and proxy (tenant id 1234-1234-12341234). To verify this the proxy certificate needs to be signed by the Tenant Certificate and exhibit a valid URI name that includes the expected Proxy ID as described in the section Public Key Infrastructure. In this example it should say: "fyde://1234-1234-12341234/proxy/8888-8888-88888888".

7) Device sends a Transport Header through the validated TLS session from point 6 following the format described in section Transport Header. The RAT received in point 5 is embedded inside this header along with other identifying and routing information required to initiate the connection to the protected resource.

8) RAP verifies the RAT is valid, not expired, and that the Device ID and Device certificate hash for which it was issued matches the client certificate received.

9) Using the routing information provided in the Transport Header and information describing the internal leg of the resources received from the centralized management console, a connection is initiated to an actual internal host or IP address.

10) From this point on, all information flows full-duplex through the tunneled connection and until the connection is terminated from either party.

iii. Continued Access after First Authorization

The mechanism described in the previous section will only allow access to a resource until the Resource Authorization Token expires, after which the connection will be forcefully terminated. To maintain an authorized connection flowing after expiration, a Device needs to repeat portions 4 and 5 from the previous flow to obtain a new RAT and send it to the RAP. All RAPs provide an internal service destined to process new RATs and will refresh the timers for existing connections to avoid termination. In some embodiments, Devices are configured to start requesting a new RAT when a connection reaches 75% of its expiration time to account for potential delays or retries required to obtain a new token and to send it to the RAP for processing.

The RAP service destined to process new authorization tokens follows the same mutual-TLS validation steps as it does for regular data connections, as described in portion 6 of the previous flow. One implementation of this service is to have a simple mutually-authenticated HTTPS service that receives the new tokens and use the same validation logic from portion 8 of the previous flow to process and refresh the timers for all active connections. Such service should be carefully devised to avoid leaking information about the validity of the tokens received and simply acknowledge the token has been received without saying if it is a correct token or not. This is to deter an attacker from using this information as an Oracle to exploit the token generation system.

6. Status Reports

Every enrolled device reports a set of metrics to the Access Policy Engine through an mTLS authenticated connection using the Device Certificate. These metrics are used by the APE to compute and update the trust level of a Device-User. Certain policy attributes represent computed values that rely on historical or other information collected, not just pointed data. For example, to calculate a stable location for a device, multiple location readings and a threshold are used. In various embodiments, devices need to report attributes or they could lose good standing, according to policy.

Other security and networking equipment can also report telemetry events to the Access Policy Engine through an Event Receiver Service that maintains a database of mappings between Device-Users and a custom equipment identifier, along with a data transformation function that converts the event into a common key-value metadata format that can be used by the Access Policy Engine.

7. Public Key Infrastructure

This section describes various trust relations between various components and the certificates used to guarantee such trust.

a. URI Format

In various embodiments, a custom Universal Resource Identifier (URI,RFC3986) is used to describe each identity in an access proxy environment. It starts with a scheme (e.g., "fyde") and a UUID4 per tenant as the authority section of the URI. The path further describes the type of object and another unique identifier for that particular identity. Per tenant UUIDs are globally unique, while object identities that pertain to a tenant are only required to be unique to the tenant. Example object types are: 'Device-User', 'proxy', 'connector', 'api'.

An example URI for a proxy identity is:
fyde://d8abcbc26-1234-4d5c-a250-ad30d74dc337/proxy/a562efab-d099-1337-1234-3255057abc1e b. Per-Tenant Authority Each tenant counts with its own Certificate Authority, which is used to sign all Device-User, Proxy, etc. certificates. This simplifies the verifications required to validate a certificate chain and tie it to the right anchor, since the path in the URI must match the authority that signed them. As an example, a Device-User certificate with URI "fyde://abc/Device-User/1234" must be signed by the per-tenant CA with URI "fyde://abc/".

c. Global Authority

Above the per-tenant level are the global certificate authorities. Fyde's PKI counts with two levels on top of the per-tenant CA to guarantee the security and availability of the system.

The signer of the per-tenant CAs is an Intermediary CA that is kept online in an isolated cluster and that is only contacted by privileged code used to create new tenants. The signer of this Intermediary CA is a Root CA that is kept off-line in a secure location and it only needs to be used when it is time to renew the Intermediary CA or in case of a catastrophic security breach.

8. Example Organization

Suppose ExampleCorp is a technology company with a decentralized structure and developers all over the world. It has most of its developer resources in a private cloud and more sensitive information like sales and salaries information in a physical server co-located in a datacenter. The section provides sample and data configuration information for ExampleCorp.

a. Groups
Developer
Accountant
Sales
DevOps b. Users
Alice Developer
   Member of groups: Developer
Roberto Accountant
   Member of groups: Accountant
Patricia Sales
   Member of groups: Sales
Joe Ops
   Member of groups: DevOps
Sahid Executive
   Member of groups: Accountant, Sales c. Policies
HR Portal
   (No RBAC rules, all enrolled users are allowed no matter the group membership)
   Block jailbroken Devices
   Re-authenticate device every 24 hours
   Enforce screen lock
Development and CI/CD
   Role-based Access Control: Developer
   Block jailbroken Devices
   Re-authenticate device every 7 days
   Screen lock enabled
   Disk encryption enabled
CRM and Customer metrics
   Role-based Access Control: Sales, Accountant
   Block jailbroken Devices
   Re-authenticate device every 2 days
   Screen lock enabled
   Minimum OS update: 30 days rolling window since last update
Production Infrastructure
   Role-based Access Control: DevOps and Joe Executive
   Block jailbroken Devices
   Re-authenticate device every 6 hours
   Screen lock enabled
   Disk encryption enabled
   Minimum OS update: 10 days rolling window since last update
Accounting Portal
   Role-based Access Control: Accountant
   Block jailbroken Devices
   Re-authenticate device every 7 days
   Screen lock enabled
   Disk encryption enabled
   Minimum OS update: 30 days rolling window since last update d. Proxies
Datacenter Proxy
AWS US-West-1 Proxy e. Resources
HR Portal
   Public host: hr.examplecorp.int
   Internal host: 10.1.2.3
   Ports: 443
   Proxy: Datacenter Proxy
   Policies: HR Portal
CI builders
   Public host: *.builders.dev.examplecorp.int
   Internal host: *.build-cluster.aws1.examplecorp.int
   Ports: 80, 443, 22
   Proxy: AWS US-West-1 Proxy
   Policies: Development and CI/CD
Development test network
   Public host: 192.168.254.0/24
   Internal host: 10.10.10.0/24
   Ports: 22, 80, 443, 3389, 8000-9999
   Proxy: Datacenter Proxy
   Policies: Development and CI/CD
CRM
   Public host: crm.examplecorp.int
   Internal host: 10.1.2.5
   Ports: 443, 3389
   Policies: CRM and Customer metrics
Production DB
   Public host: *.dbs.examplecorp.int
   Internal host: *.dbs.aws1.examplecorp.int
   Ports: 1433
   Policies: Production Infrastructure
Accounting Portal
   Public host: accountsuite.examplecorp.com
   Internal host: 10.1.2.6

Ports: 443
Policies: Accounting Portal
f. Access Examples
Alice Developer can SSH into ci1.builders.dev.examplecorp.int, but can't log in into the Production Database db1.dbs.examplecorp.int.

Patricia Sales can access the CRM portal at crm.examplecorp.int and the HR portal at ht.examplecorp.int but can't logging to the accounting portal at accountsuite.examplecorp.com.

Sahid Executive is included in the roles necessary to access the production databases, but he hasn't updated to the latest OS update in more than a month, so he gets a Remediation message saying he needs to upgrade his OS to be allowed access.

9. Extension: Sending Authentication Metadata Downstream

A resource can be configured to receive metadata about the authenticated connection to allow for identification of the client and destination. In the case of HTTP backends, this information can be added as extra Headers to the request. For non-HTTP backends, a self-contained custom data structure (described above) can be used and will be prepended before any data is passed. A non-HTTP backend daemon would have to be wrapped with a client that understands this format to be able to use the metadata and discard it before passing control to the daemon. In both cases the connection between the proxy and a backend server needs to be authenticated or inline authentication information must be added (e.g., signed headers). There are two authentication phases: User to AP, and AP to backend.

HTTP Connections will have a set of Headers added, all starting with the prefix X-Fyde-RAP—followed by the metadata key and value. Non-HTTP connections will have the following data structure prepended:

Total Length of Metadata Structure. (Unsigned Integer 32 bits Little Endian.)
Total Number of key-values. (Unsigned Integer 16 bits Little Endian.)

After this header comes a variable sized array of keys and values in a length-prefixed format:

Key Length. (Unsigned Integer 16 bits Little Endian.)
Variable key data.
Value Length. (Unsigned Integer 32 bits Little Endian.)
Variable value data.

V. Example Scenario—Alice the Contract Programmer

In the following discussion, suppose Alice is a contract programmer (e.g., earns money by performing various programming jobs for various companies). Alice is going to start a new programming job at a company, ACME, for which she has not previously done work. ACME uses various infrastructure described herein (e.g., access proxies) and has encouraged to download and try out the Fyde app on her phone (e.g., an iPhone) and laptop in advance of the start of her job.

A. Initial App Use

Alice downloads the Fyde app from the Apple App store. She launches the Fyde app and agrees to let the Fyde app send her notifications. The Fyde app then asks her to create a VPN configuration. She provides her passcode and a Fyde VPN profile is created on her phone and appears as an entry on the list of VPNs available on her phone (e.g., under settings→VPN). The profile indicates that the Fyde app is the backend of the Fyde VPN profile. Every time the Fyde VPN is engaged (e.g., Alice switches on the Fyde VPN), the OS will provide the Fyde app with access to the VPN stack of her phone and allow the Fyde app to take over all of the network communications of the device. It binds the Fyde profile with the Fyde app and from that point on, all the packets will be sent to the Fyde app.

Figure 9A:
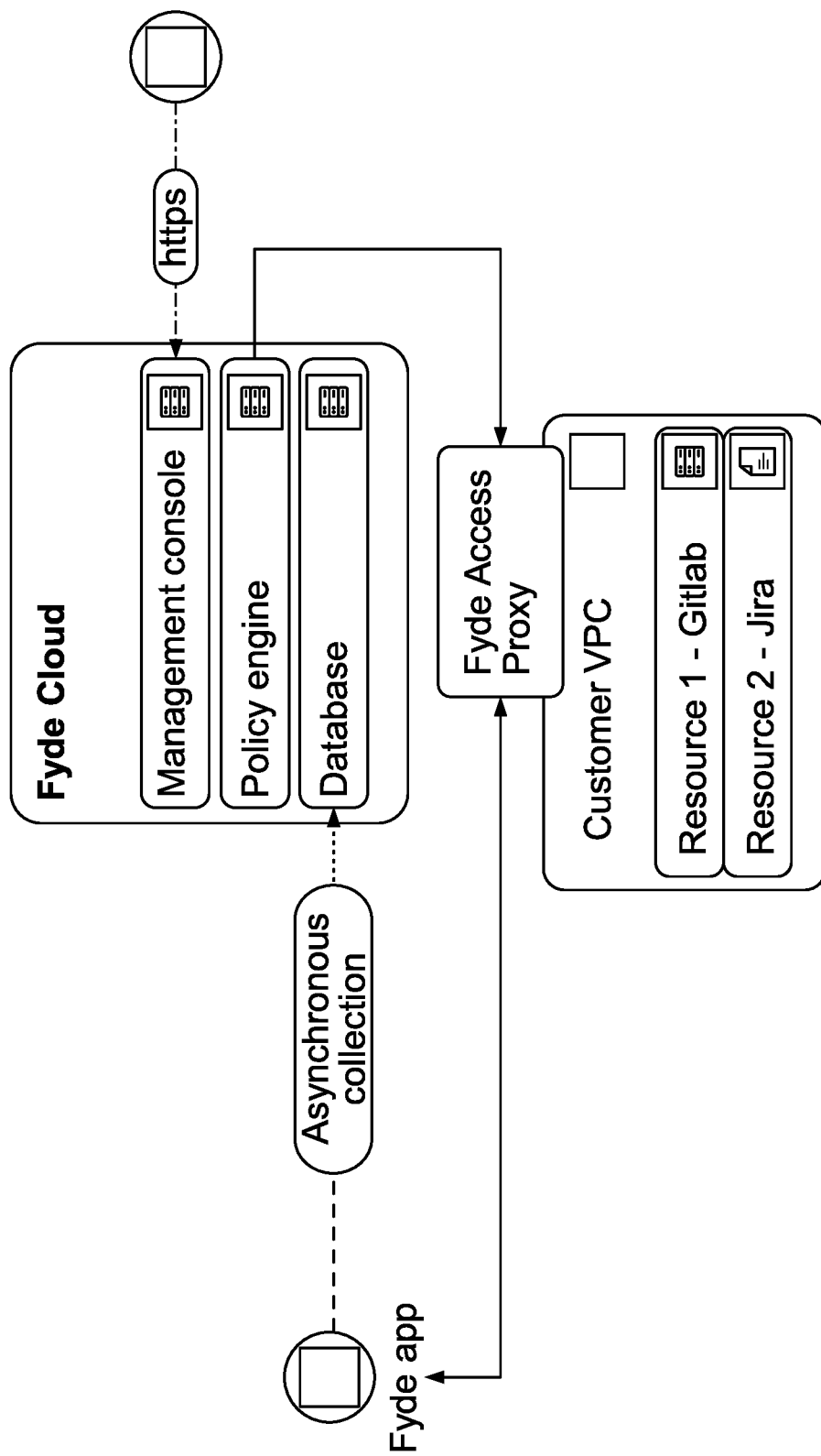
FIGS. 9A-9E illustrate embodiments of environments that incorporate security techniques described herein.
Figure 9B:
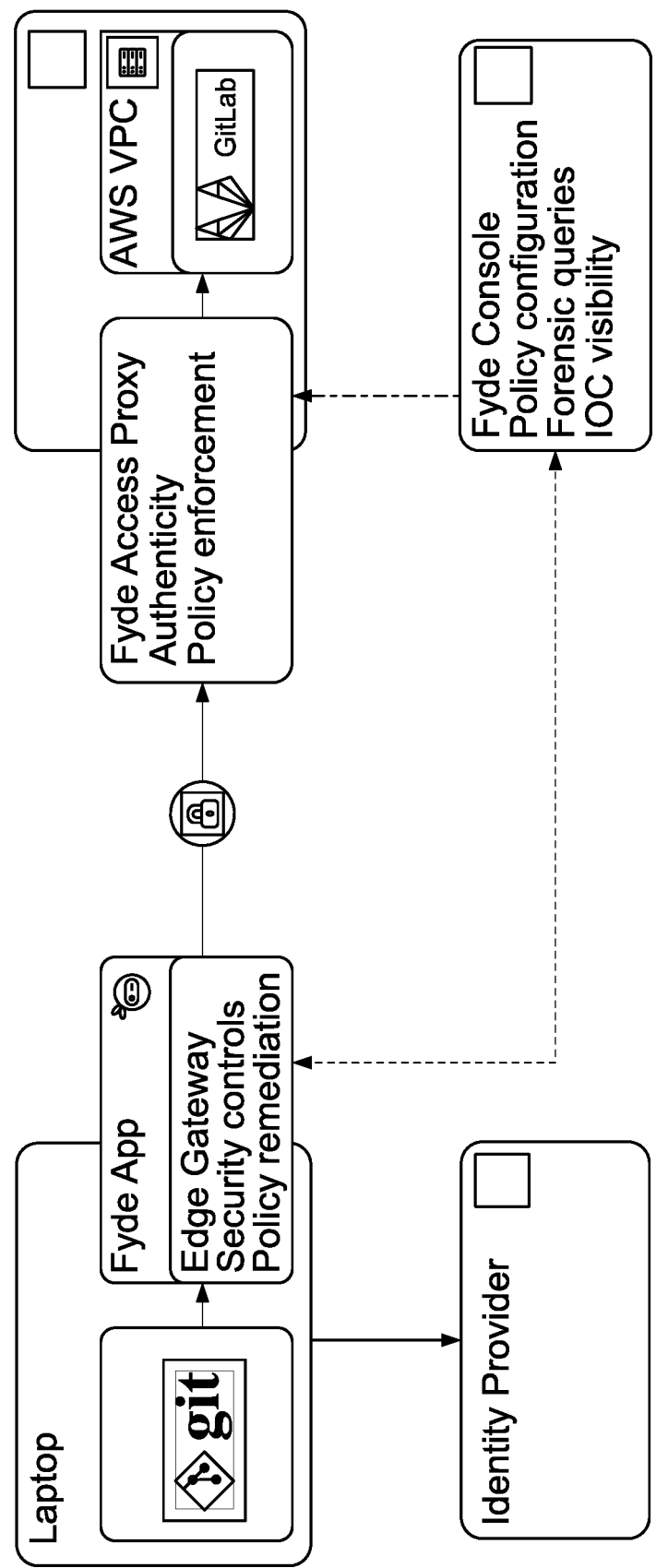
Figure 9C:
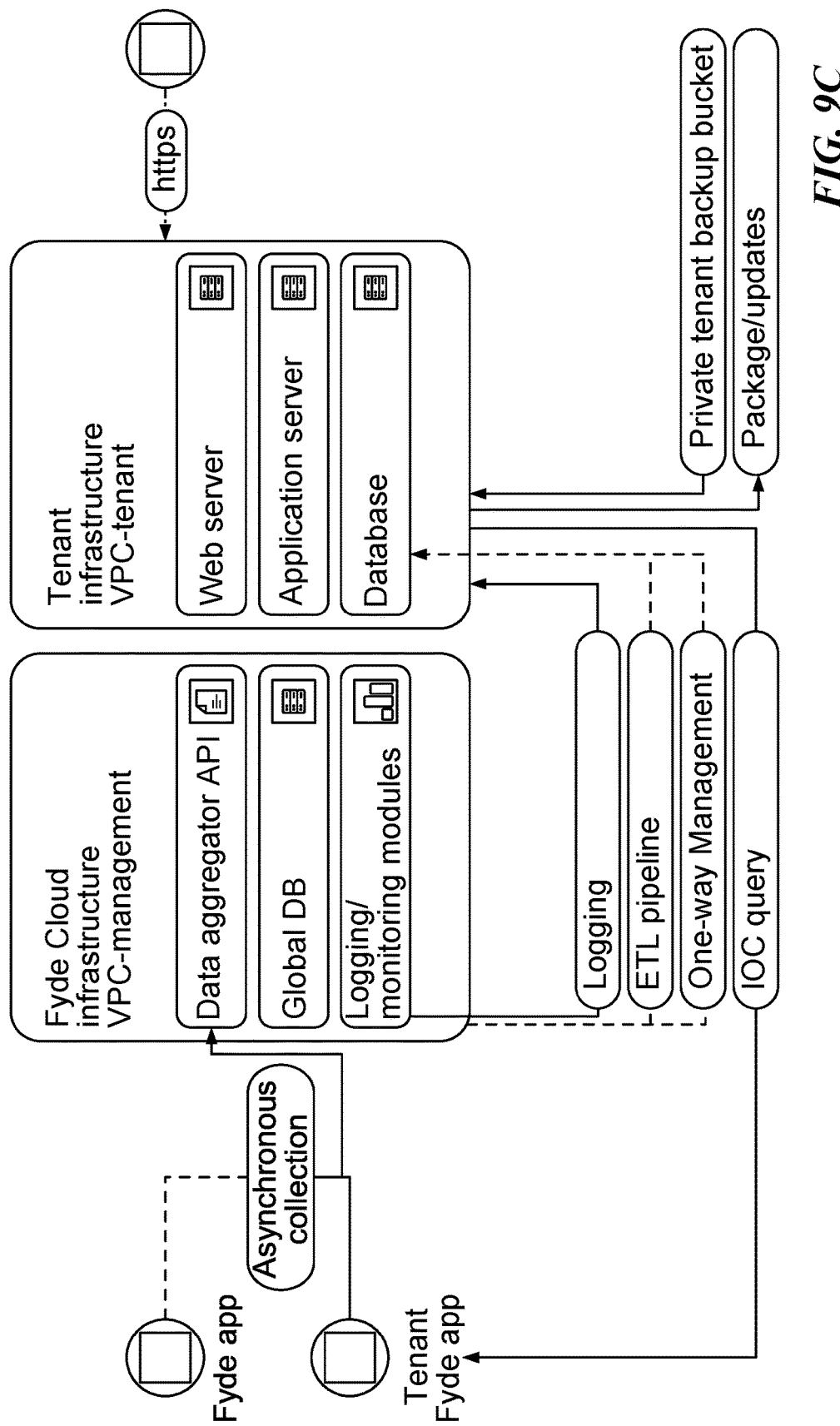
Figure 9D:
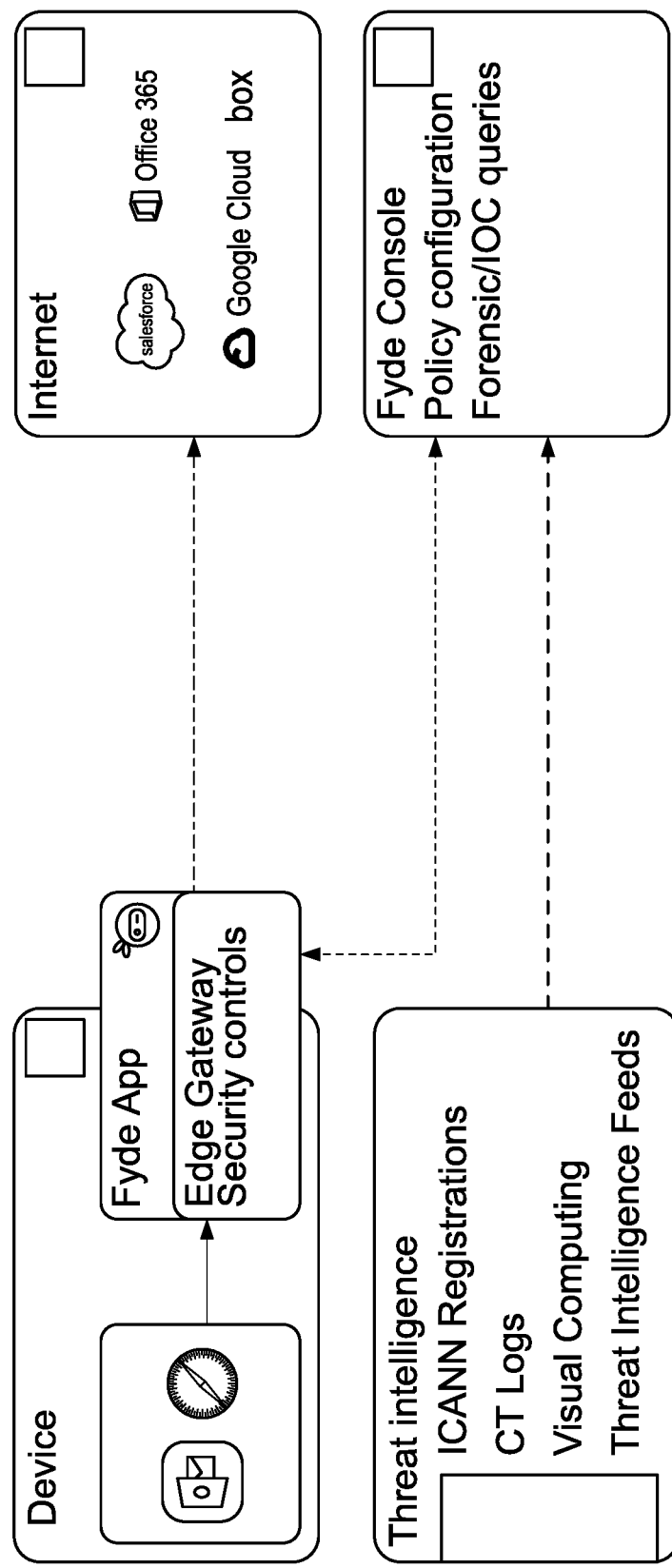
Figure 9E:
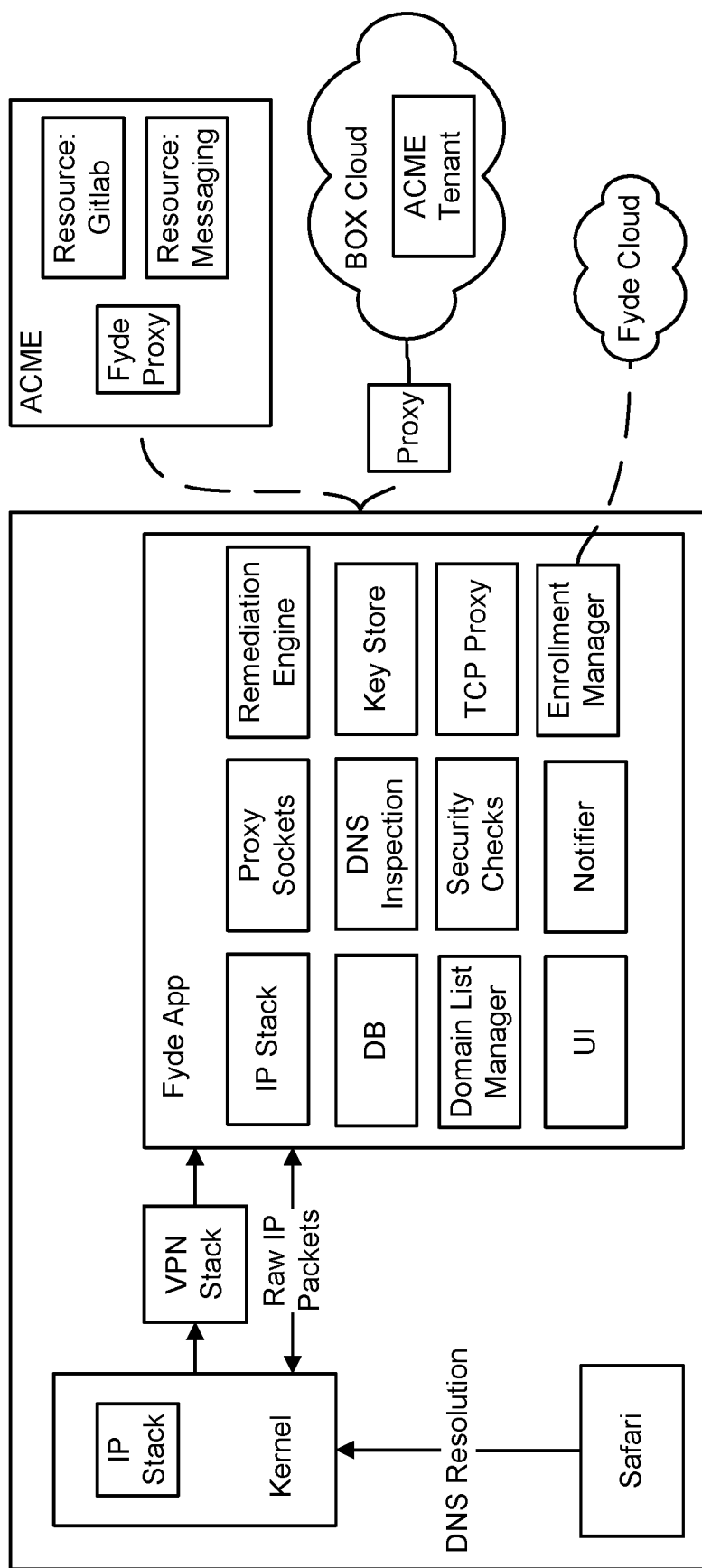

Now that she has installed the Fyde app and has switched on the Fyde VPN, suppose Alice wants to visit a website (www.example.com) on her phone. She opens Safari on her phone and types www.example.com into the browser. As shown in FIG. 9E, Safari creates a new connection to one of the nameservers configured on her device to resolve www.example.com to an IP address. The nameserver information used by the Fyde VPN can be whatever nameserver information was previously configured on her device (e.g., by her carrier) and/or can also be nameserver information selected by/provided by Fyde or another appropriate entity.

When Safari asks for resolution of www.example.com, it creates a DNS request packet and the kernel on her phone will attempt to send the packet to the name server for resolution. Without the Fyde VPN profile switched on, the DNS request packet goes from the IP stack in the kernel over an appropriate interface (e.g., WiFi or LTE), goes to the name server, and the resolution will be returned back to the kernel, which will return the resolution to Safari as an IP address. With the Fyde VPN profile switched on, the first part is the same—the kernel will create a DNS request packet. However, instead of sending the packet directly to an interface, the kernel will instead send the packet to the VPN stack. The VPN stack will look up what the active VPN profile is, determine that it is Fyde, and send the raw IP packet to the Fyde app. The Fyde app receives the DNS request packet on its IP stack component. The Fyde app parses the packet, retrieves the data off the packet and creates a socket to the internet. The Fyde app replicates (reimplements) the IP stack functionality of the kernel in the Fyde app. Since the Fyde app is creating sockets itself, the Fyde app has a chance to read the data before deciding whether to send it. At this point, the Fyde app can perform DNS inspection. Before sending the DNS resolution request to an external nameserver, the Fyde app can examine what the request is for (e.g., www.example.com). One of the potential outcomes of the inspection is "pass through"—meaning the request to resolve www.example.com will be sent out by the Fyde app to a nameserver. One example of where this can occur is where the domain (www.example.com) appears on a whitelist of domains. Another example of where this can occur is where the domain is not present on a blacklist (e.g., no results are found during a lookup). Suppose the domain is known to be malicious (www.baddomain32.com). During DNS inspection by the DNS inspection component of the Fyde app, the DNS inspection component communicates with the domain list manager. The domain list manager determines that www.baddomain32.com is a phishing domain. When that happens, instead of being allowed to "pass through," the state will be "deny." In that case, instead of sending it to the Internet, a DNS response is created saying that domain is not available: a synthetic NX response is created and sent back to Safari without ever touching the Internet. That is a second possible action out of the DNS inspection. A notification can also be generated by the Fyde app, alerting the user (e.g., Alice) that she has just been protected from a phishing attack by the Fyde app. Another type of domain that can be blocked is a domain known to be associated with advertising. As with a phishing domain, if Alice is opted to block advertising domains (as a category of sites to be blocked), a notification can be shown, or not shown to Alice (e.g., at Alice's preference).

As needed/applicable, Alice can use the UI of the Fyde app to configure exceptions. For example, suppose Alice would like to visit the website, www.kj2387d.com, which she knows to be a legitimate site but the Fyde app erroneously classifies as a phishing site. When Alice receives a notification that the Fyde app has protected her from www.kj2387d.com, Alice can visit the UI and add www.kj2387d.com as an exception (e.g., as a user-level override). The Fyde app can support a variety of levels of overrides. For example, and as will be explained in more detail below, once Alice begins working at ACME, she can be supplied with ACME-specific overrides/domain customizations. Alice can manually enter an exception for www.kj2387d.com using the UI. She can also view a log of her network activity, see where www.kj2387d.com was blocked, and create an exception (e.g., "allow www.kj2387d.com") by clicking on the activity.

A third thing that can happen as a result of the DNS inspection is that the domain list manager identifies the request as belonging to a bank (or other sensitive site) (e.g., by checking with the domain list manager which identifies the domain as a bank). When that happens, security checks that are contextual to that particular bank (or other sensitive site) that Alice is trying to connect to can be performed. As an example, suppose Alice attempts to visit the website of her bank, www.legitbank.com. Legitbank.com (along with the domains of other legitimate banks) appear on a list managed by the domain list manager. Associated with www-.legitbank.com is a list of assets and, as applicable, values/data associated with those assets. The sequence in which those assets should be requested can also be stored and compared against the current requests being made by Alice's phone. For example, when Alice uses Safari to navigate to www.legitbank.com, it is expected that, in order to render the page for Alice, content will need be retrieved from www.legitbank.com, and also a variety of additional sites (e.g., as hosted with one or more content delivery networks, served by ad networks, etc.). In addition to checking that the assets are requested from the expected locations and are requested in the expected sequence (e.g., base page, then images, then interactive script elements), additional contextual checks can also be performed, e.g., confirming that appropriate TLS certificates are provided, that the domains resolve into expected ranges that are owned by LegitBank, etc.

B. ACME Onboards with Fyde

In the following section, suppose ACME has decided to start using Fyde infrastructure (e.g., to protect its users from phishing and other attacks, and also to provide secure access to ACME resources to individuals like Alice). As a first step, a tenant for ACME is created inside the Fyde Cloud (an example of which is a Software as a Service hosted using multitenant infrastructure). Creation of the ACME tenant in the Fyde Cloud gives ACME administrators (e.g., an administrator hereinafter referred to as Joe Smith) access to an ACME management console/dashboard.

Included in the Fyde Cloud is a front proxy. Examples of off-the-shelf front proxies that can be used include NGINX, HAProxy, and Envoy. Traffic received at the front proxy is routed to the enterprise backend. The enterprise backend comprises a web application that can be used (e.g., by each tenant) to perform enterprise management tasks such as creating/removing users, creating/removing resources, managing certificates, managing licenses, etc. An example way to implement the enterprise backend is using Ruby. In addition to being accessible as a web application (e.g., offering a console Joe can log into), functionality of the web application is also made available via a restful API. The enterprise backend is connected with a multitenant database (e.g., a PostgreSQL database) that stores, for each tenant, information about their respective users, resources, etc.

The Fyde Cloud also includes a policy engine. An example off-the-shelf policy engine is Open Policy Agent.

The Fyde Cloud also includes a certificate management server. Examples of off-the-shelf certificate management servers that can be used include HashiCorp Vault, and Cloudflare SSL. When ACME is onboarded, a tenant for ACME is created in the database, and a set of certificates is created for ACME in the certificate server. The certificate server provides, for each tenant, its own tenant-specific certificate authority. Another customer of Fyde, e.g., Beta, will have its own certificate authority. Fyde holds a root certificate that is kept offline, and an intermediate certificate (e.g., kept in Vault). Each tenant certificate authority is created using the intermediate certificate. As will be described in more detail below, devices (e.g., Alice's phone) each store certificates, and certificate chains are checked each time a device connects.

In addition to the Fyde Cloud, in various embodiments, a separate Data Cloud is used in conjunction with the techniques described herein. The Data Cloud also makes use of a front proxy. The data Cloud further makes use of an Extract-Transform-Load (ETL) pipeline (e.g., to receive event information and store it in an elastic search cluster). Example off-the-shelf infrastructure that can be used for the ETL pipeline includes Kafka and Elasticsearch. Events are reported to the data front proxy which provides them to the ETL pipeline for processing. As an example, any time a domain is blocked by an instance of a Fyde app (e.g., Alice's phone is prevented from visiting a phishing site), that blocking event is stored using the ETL pipeline and can be surfaced in a console that provides statistics on how many domains were blocked, why, etc. Further, Alice's copy of the Fyde app, and/or an appropriate administrator (e.g., where Alice has enrolled with an enterprise such as ACME, as applicable) can also view collected event information.

In addition to the Fyde Cloud and Data Cloud, in various embodiments, a separate assets repository is used in conjunction with the techniques described herein. The assets repository stores information about assets, such as domain categorization (e.g., as provided to it by an asset generator), as well as per-tenant assets overrides (e.g., as domain list exceptions). Devices (e.g., Alice's phone) download data such as blacklists from the asset repository. One example off-the-shelf way of providing an asset repository is by using AWS. Assets can be provided to the asset repository in a variety of ways. As one example, third party data sources can be used (e.g., third party lists of known advertising domains, phishing domains, etc.). As another example, data collected by user devices can be analyzed, e.g., for evidence that a previously unseen domain engaged in phishing behaviors with respect to a given device. The assets repository also receives user preferences (e.g., for/against blocking particular domains), and other overrides (e.g., as provided by ACME and applicable to all ACME-registered devices), and is responsible for merging default asset information with override information. As another example, an enterprise, such as ACME, might have a subscription to site classification data that is not publicly available (e.g., ACME might license a list of threat domains or build its own list from its own security infrastructure to protect against targeted attacks, etc.). ACME can merge its internal domain lists with default domain information that's available to all users of Fyde services to arrive at an ACME-specific list.

Figure 10:
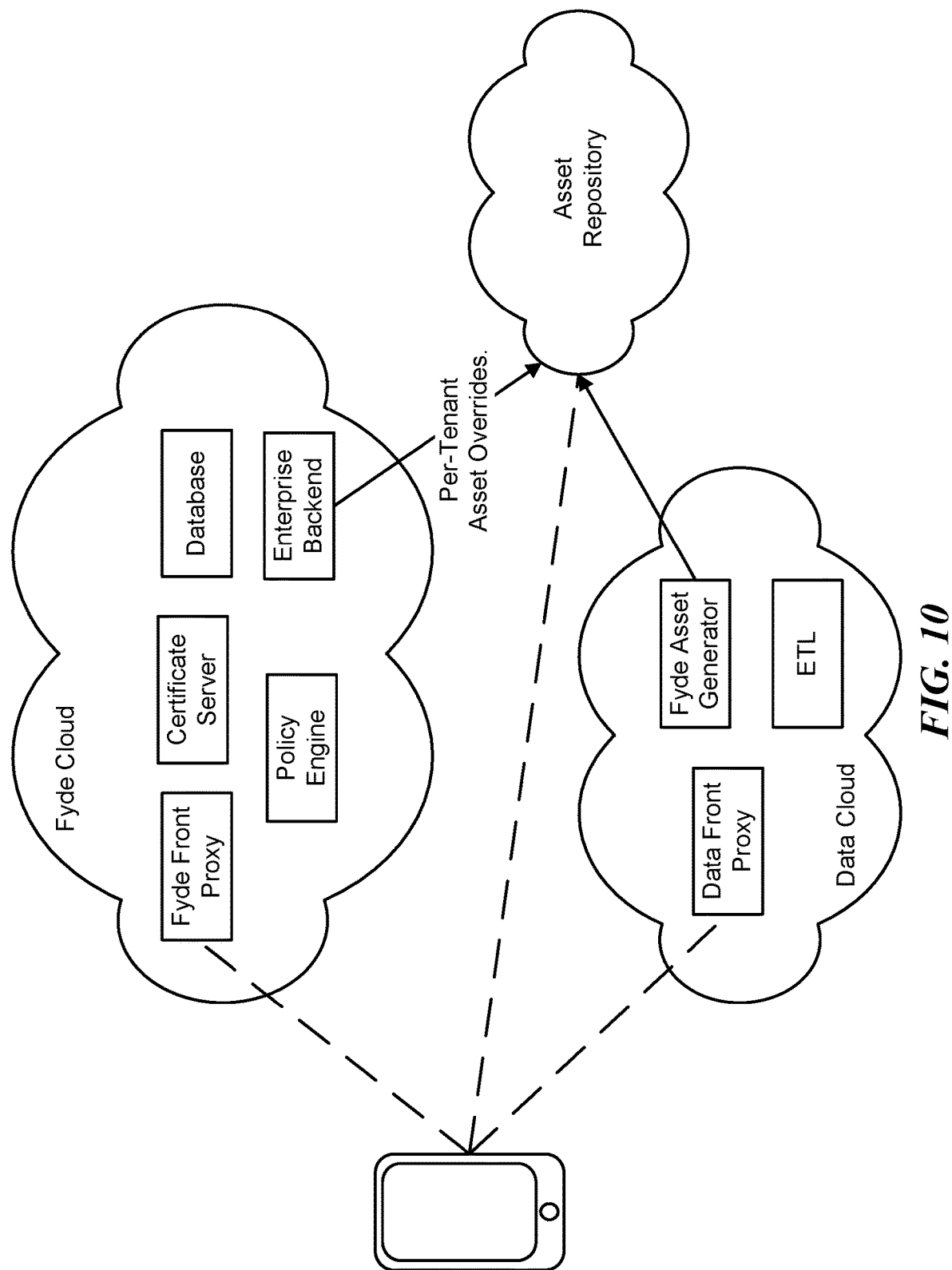
FIG. 10 illustrates an embodiment of an environment that incorporates security techniques described herein.

In the example shown in FIG. 10, various components are provided, respectively, by the Fyde Cloud, Data Cloud, and Asset Repository, based on typical availability/redundancy requirements. As one example, to help ensure that client devices can quickly and efficiently download domain lists, the hosting of such lists is provided by a high-availability system (e.g., behind a Content Distribution Network). Other implementations can also be used, e.g., with the Data Cloud and Asset Repository being colocated, or with the Fyde Cloud and Asset Repository being colocated, etc.

C. ACME Enrolls Alice

On Alice's first day with ACME, Joe sets up various typical enterprise accounts/credentials for Alice (e.g., providing her with a corporate email address, etc.). He then creates an account for her with Fyde by logging into the Enterprise Backend and accessing ACME's Fyde management console. He creates a Fyde account for Alice (e.g., entering her name and her new ACME email address: Alice@ACMECorp.com). Joe also specifies other information, such as the number of devices Alice is allowed to enroll (and, if applicable, the type of devices that can be enrolled, e.g. phones and laptops, phones only, Android phones only, etc.). Device-characteristic enforcement can also be performed at the time Alice attempts to access resources using one of her devices. Thus, in some embodiments, no restriction is placed on the type of devices that can be enrolled, but rather on what those devices can access. Joe also specifies an expiration date for Alice's ability to enroll devices.

Once her information is entered, Alice will receive a link, via email, that she can use to enroll her device with Fyde on behalf of ACME. The email message provides instructions, such as how to download the Fyde app for her device(s), and the time limit ("please enroll within five days"). Links such as to the Google App store and Apple iOS store are included, as are (as applicable) links for other devices, such as a Windows installer, Linux package, etc.

Since Alice has already downloaded and installed the Fyde app, she clicks on the enroll link included in the email she received. The email includes an enrolment token (e.g., a magic link) that is unique, that associates that device to that user. As will be described in more detail below, some enterprises make use of identity provider infrastructure (e.g., SAME). Enrollment for such providers can make use of such infrastructure if desired. Suppose ACME does not use an identity provider. The magic link included in Alice's email is a cryptographically secured token that is associated with Alice's account.

In various embodiments, the enrollment manager component is responsible for communicating with the device's key store (whether it be a hardware keystore or other appropriate secure location), creating CSRs, storing certificates, etc. When she clicks on the enroll link, the enrollment manager component of the Fyde app (also referred to herein as the "encryption manager component") executing on her phone provides the token to the Fyde Cloud (e.g., via an API) to confirm that the token is valid (e.g., Alice's account hasn't been removed, the deadline for using the token hasn't expired, and Alice has not used all of the device enrollment slots she was allocated).

Here, since Alice's token is valid, the enrollment process continues, coordinated by the enrollment manager component of the Fyde app executing on her phone. First, the enrollment manager facilitates creation of a public/private key pair on her device. As one example, a keypair using NIST P-256 elliptic curves is generated. Assuming Alice's device supports it, the keypair is generated in/secured by a secure enclave or hardware keystore of her device, and her private key is set as not exportable. In the case of a laptop enrollment, the private is secured on a trusted platform module (TPM) or other appropriate location. If Alice's device does not support secured hardware storage of her private key, the most secure storage location available to the device is used (e.g., a software encrypted keychain, a file with limited read permissions on disk, etc.).

If Alice's device (e.g., its operating system) natively supports public/private keypair generation (e.g., iOS providing a key generation API), that functionality can be leveraged to generate the keypair during enrollment. If Alice's device does not support such functionality, it can be provided by the Fyde app executing on her device. The public key of Alice's generated keypair is used to create a Certificate Signing Request (CSR). The CSR can be generated by Alice's device (if native support is available) and if not, (e.g., in the case of iOS), the CSR can be generated by the Fyde app executing on her device.

The URI scheme for Fyde certificates follows a notation like this:

Per-tenant Certificate: fyde://<tenant identifier>/Device Certificate: fyde://<tenant identifier>/device-user/<device identifier>Proxy Certificate: fyde://<tenant identifier>/proxy/<proxy identifier>

All identifiers are random UUID4-formatted strings. The certificates themselves don't carry any other identifiable information.

The enrollment manager sends the CSR to the Fyde Cloud (e.g., via an API), and after again verifying that the token remains valid and that the CSR is well-formed, the certificate server signs the CSR with the per tenant CA. The per-tenant CA is considered the root of trust for all tenant leaf certificates. It is signified by the fact the Common Name of the per-tenant CA is the root path for the fyde://URI (ie. fyde://3b4e6458-adbf-4721-b8cf-65912e35c695/).

The PKI hierarchy is as it follows:
A root CA kept offline in a secure location (see FIG. 11)
An intermediary CA kept in a Secrets Manager service (See FIG. 12)
A per-tenant CA also kept in a Secrets Manager service (See FIG. 13)
Leaves are Device Certificates (See FIG. 14) and Proxy Certificates (See FIG. 15)

The certificate server returns the signed certificate back to the enrollment manager (e.g., via the backend front proxy). The enrollment manager will take the certificate and store it in the key store and that finishes enrollment. From that point on, any connection needed with the Fyde Cloud or any connection needed with a proxy (i.e., any time that identification/authentication is needed) the certificate can be used. It's signed by the per tenant CA and it uniquely identifies the origin of the traffic/device. The device can be identified strongly, securely, and in a way that cannot be cloned or exported. If Alice loses her phone or gets a new one she will have to re-enroll the phone, as the private key is not exportable (and thus cannot be restored to a new phone from a backup).

As one additional part of the enrollment process, the enrolled device is configured with any applicable per-tenant information. As one example, Alice can be restricted from making changes to Fyde app settings (e.g., she can be prevented from creating exceptions). As another example, the enrolling device is sent a manifest that instructs the enrollment manager provides to a domain list manager component of the Fyde app. The manifest enumerates the domain list(s) to be used by the app, and provides a URL from which they can be downloaded. The domain lists can be specified per-tenant, and can also be specified with more granularity. For example, ACME could send to Alice a set of three domain lists—one applicable to all ACME-facing devices, one (e.g., more restrictive) applicable to any employee classified by ACME as a contractor, and one applicable just to Alice's devices. The enrollment manager can also be provided with a list of resources to proxy. Which information is sent to which device can be configured/enforced (e.g., by Joe) via the policy policy engine.

An additional task performed by the enrollment manager is to periodically communicate with the Fyde Cloud to ensure that the device should continue to be enrolled. If Alice is fired, Joe can (e.g., using the Fyde Cloud console or an API) remove her as an ACME user of Fyde. When the enrollment manager receives an indication that Alice's account with ACME has been removed, the enrollment manager can instruct Alice's phone to remove any applicable keys/certificates from her keystore, and will rollback any ACME customizations (e.g., reverting from a custom manifest to the default consumer manifest available to the general public).

1. Use of Identity Provider Infrastructure

As mentioned above, some enterprises make use of identity provider infrastructure in their networks. Such infrastructure can optionally be incorporated into techniques described herein. When a tenant is created for an enterprise with such infrastructure, in addition to the previously mentioned actions being taken, the administrator (e.g., Joe) indicates that the tenant supports such infrastructure (e.g., SAML, Oath2, OpenID Connect), that the tenant would like to use such infrastructure to authenticate its users in connection with Fyde, and any applicable configuration details. From that point on, for any user that ACME creates with Fyde, the email in Fyde for that user should match the one used with the identity infrastructure. And, whenever a user attempts to enroll a device in such an environment, instead of the magic token, the enrollment manager makes use of the identity management infrastructure.

D. Proxying

Suppose Alice will be needing access to two internal ACME resources to do her new job: an internal issue management system (e.g., Gitlab) and an internal chat system (e.g., Mattermost). Alice will also need access to a Software as a Service resource, such as ACME's Box resources (which uses ACME's IP address range to provide access controls). In this example, Gitlab and Mattermost are internal resources that are hosted either in-house, or available through private cloud (e.g., a VPC), and access is restricted to certain people following certain policies, and having devices with certain attributes.

Using Mattermost as an example, suppose Alice downloads a Mattermost client on her phone. She specifies the server as mattermost.acme.local (a domain that is only resolvable within the ACME corporate network). As mentioned above, during enrollment, one piece of information received by Alice's device was a mapping of resources to proxies. The mapping indicates how to connect to a particular resource. ACME might make use of a single proxy, but also can make use of multiple proxies. As an example, ACME might have a proxy for internally hosted resources, and a respective additional proxy for each cloud provider (e.g., a Google proxy, an Amazon proxy, and a Microsoft proxy). As another example, if ACME has multiple physical locations (e.g., a Denver office and a London office), respective proxies would be deployed for the respective locations.

Suppose mattermost.acme.local is an example of a proxied resource included on the resource list received by the enrollment manager. When Alice attempts to connect to the domain, an attempt will be made by the Mattermost app to resolve the domain. The request can be intercepted by the Fyde app and synthetically resolved, without the request going to a domain server. Similarly, if Alice attempts to connect to acmescorpdocs.box.com, the DNS resolution request can be intercepted by the Fyde app and synthetically resolved.

Figure 16:
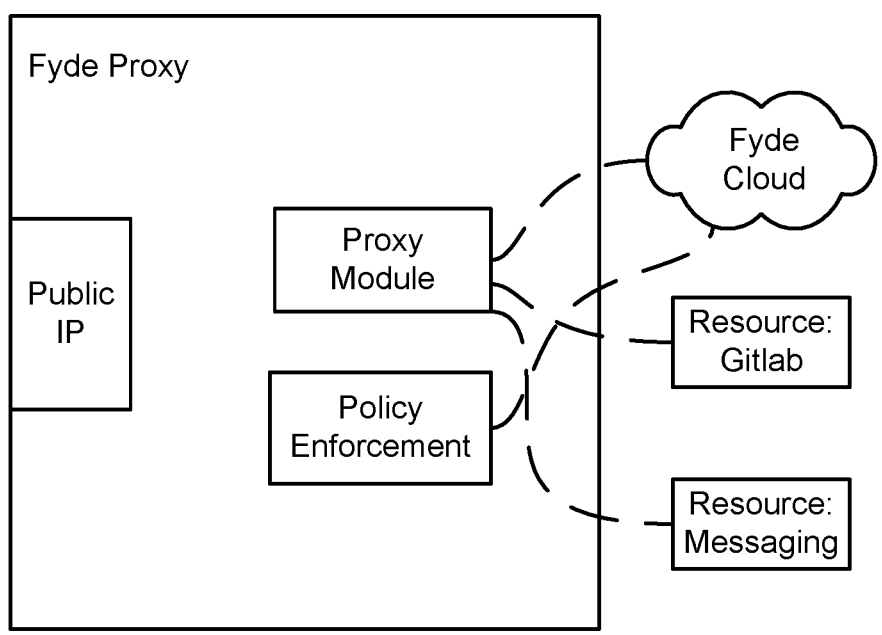
FIG. 16 illustrates an embodiment of an environment that incorporates security techniques described herein.
Figure 17:
FIG. 17 shows example mappings between public hosts and internal hosts.

As shown in FIG. 16, ACME has two proxies. mattermost.acme.local is mapped to a particular port on the first proxy, and Gitlab.acme.local is mapped to a different port on the proxy. The second proxy is used to map access to ACME's Box resources. FIG. 17 shows some example mappings. Note that the user experience for Alice is transparent. She can type "box.com" or "acmescorpdocs.box.com" into her browser and it will be automatically resolved to the appropriate proxy information.

DNS inspection indicates that this is a domain that needs to be proxied. It communicates to a TCP proxy which is going to create an mTLS, or mutually authenticated TLS, connection to the proxy that needs to be connected, and then tunnel all the packets directly to the proxy, and from the proxy to the resource. The mTLS connection will use the device key that was created before and stored in the key store and it's going to encrypt everything using that key.

Fyde proxy provides two core functions. It is a proxy itself and also performs policy enforcement. The Fyde proxy provides a public interface with a public IP so that devices can access the proxy. The proxy module has a table of resources (that it obtains from the Fyde Cloud) that indicates which resources it can connect to. The proxy module performs multi-plexing to the resources in the table.

The policy enforcement module also communicates with the Fyde Cloud. Suppose a connection is received at the proxy from a device that has a device ID and a key that is used for mTLS. When the device connects, a client certificate that identifies the device. Two pieces of information are present: one indicates the identity of the device and the other identifies the resource for which a connection is sought. In various embodiments, the proxy sends those two pieces of information to the policy enforcement module and the policy enforcement module checks with the Fyde cloud to see whether that particular device allowed to connect to that particular resource. The cloud returns a yes or no response, and based on that the connection is allowed (or not allowed) to continue. As one example, the Fyde cloud will determine whether or not the user that enrolled the device is still a valid user (e.g., has not been removed from the database). Finer grained checks can also be performed, e.g., ensuring that a given resource is only accessed from a device having certain characteristics (e.g., device OS version number or patch level, whether or not whole disk encryption is activated, etc.). As one example, Alice could be allowed to access Gitlab and Mattermost with all of her enrolled devices, but only allowed to access Box with her corporate laptop (or, e.g., corporate issued iPad).

The policy enforcement can use both role-based access control and attribute-based access control. For example, does the device have (as an attribute) that a pass code is set? Whether it is jailbroken and what OS version it is running are also attributes. Whether the user is a member of the accounting group is a role-based access control. As explained above, both types of controls can be used. One way to perform such access control checks is for the policy enforcement module to ask the Fyde cloud and cache the response for a small period of time (e.g., 30 seconds). This will allow for short bursts of requests to be handled efficiently, but also allow for near instantaneous propagation of any changes in authorization to access a resource. For example, if Alice is fired, her access to all resources controlled by Fyde infrastructure can be simultaneously rescinded in 30 seconds. Or, if Alice loses her phone or her phone is stolen, that device can quickly be disenrolled from Fyde access thus terminating the ability of the device to access any ACME resources.

In some embodiments, a Publisher-Subscriber model is used for communicating policy enforcement information. Similarly, as a contractor, it may be desirable to give Alice access to various systems infrequently, but for specific windows of time. Alice can efficiently receive and have revoked fine grained access, including to legacy systems which may not support robust account management (e.g., a legacy system with a single "admin" account, or an account where all users have equal authority, can have fine grained access control applied using the techniques described here). The techniques described herein allow for the adding of SAML, multi-factor authentication, attribute-based and role-based access controls, etc. to be layered on top of such legacy systems in an efficient manner.

In a traditional enterprise environment, it might be common to provide access to internal resources using a VPN that tunnels IP packets. Unfortunately, to provide more security in such a scenario, one would need to create different VLANs and/or different ACLs for every person that acts as a resource which is likely to be unmanageable. What often occurs instead is that administrators create buckets of resources (e.g., internal vs. production). A common problem in such an environment is lateral movement, for example, where a network printer gets compromised and from that printer access can be gained to other network elements.

Using the techniques described herein, lateral movement is not possible. Resources are isolated and cannot talk to each other and the way that the user can talk to them through the proxy. There's no concept of accessing to a "network," instead, access is to a "resource." If a user has access to a first resource, that does not mean that the user can run something like Nmap and enumerate all the potential resources. The user only has access to a defined list of resources and nothing else. Separately, use of the techniques described herein allow a user, such as Alice, to access resources at two different locations (e.g., Denver office and London office) simultaneously—something not possible with a traditional VPN approach (which would require Alice to access Denver resources via a Denver VPN, and disconnect from the Denver VPN to connect to the London VPN and access London resources).

As with the front proxies described herein, the Fyde proxy can be implemented using off-the-shelf proxy products (e.g., Envoy, NGINX, HAPRoxy). An example way to implement policy enforcement module is using python code. The policy enforcement module can take as input the resource for which access is requested, and which device is trying to access it (e.g., which mTLS client certificate).

Suppose a nefarious individual, Mallory, has discovered the public IP of the Fyde client and that port 443 is open (e.g., through a scan). Mallory attempts to access the proxy but her device lacks a client certificate issued by ACME, the Fyde tenant. As the only entry point to the proxy is a TLS server, the only option Mallory has (subject to bugs in the TLS library) is to start to talk TLS with the server. The server is configured to require client certificates and to drop the connection if there's no client certificate. Suppose Mallory determines that a client certificate is needed, and manages to create a self-signed client certificate that follows the expected format. The proxy is configured (as part of its own enrollment process) to trust only the per-tenant certificate authority. And, the only way for Mallory to obtain a certificate signed by the per-tenant certificate authority would be if Mallory successfully completed ACME's enrollment process.

Now suppose that instead of finding the proxy on the internet through a scan, Mallory is a disgruntled former employee who was recently fired (but previously had legitimately obtained a client certificate for use with ACME's infrastructure). Her plan for circumventing ACME's infrastructure is to tamper with the Fyde app on her phone to prevent it from un-enrolling her (e.g., to firewall her internet connection and avoid her phone receiving an unenroll message from the Fyde cloud). Mallory's device could potentially have a legitimate certificate, signed by the appropriate per-tenant CA, to present to the proxy. When the proxy contacts the Fyde cloud to see what resources Mallory's device should be given access to (i.e., for which resources the proxy should provide proxying to Mallory), the Fyde cloud will respond that Mallory is not authorized to access any resources, and the proxy can drop the connection.

Now suppose that, prior to being fired, Mallory created a rogue proxy with the hopes of being able to trick users like Alice into connecting to the rogue proxy and reading packets at the rogue proxy. The infrastructure used in mTLS, which requires mutual authentication. When Alice's device connects to a proxy, it both provides its certificate and receives a certificate from the proxy. When Alice enrolled her device, she received a manifest that indicated which proxies she should use. Alice's device will verify information such as that the issuer of the proxy is correct, that the certificate is valid, and that it was issued for the expected tenant. Alice's device will also be able to determine whether it is connected to the correct proxy and not connecting to a different proxy or a malicious proxy.

In various embodiments, the proxy sends a proxy identifier to the client before obtaining the client certificate. This allows the client to determine whether the proxy has an expected proxy ID (according to the manifest information). If the proxy sends the correct identifier, then the client sends its certificate. From this interchange the device confirms that the proxy is the correct one, and the proxy knows the device's identity. This is how the policy enforcement receives the device ID in various embodiments: it gets it from the certificate. The proxy sends the common name of the client device certificate to the Fyde cloud when performing checks. The proxy doesn't need to send full the certificate since the proxy is performing the TLS verification.

In various embodiments, SNI is used to tell the policy enforcement module and the proxy for which resource a connection is sought (e.g., Gitlab vs. Mattermost) by supplying one of their respective resource IDs. At this point, the policy enforcement module has two pieces of information: the resource ID and port that the device is trying to connect to, and the device ID. With those two pieces of information it can make a decision.

If the policy enforcement module returns a "deny" verdict, the proxy closes the connection. That would be the case with Mallory. Her device might have a valid certificate but when the proxy queries the Fyde cloud, the Fyde cloud will say no, this user was removed or disabled.

1. Remediation

Suppose Alice has also enrolled a tablet with ACME's Fyde configuration. Alice would like to access a resource (e.g., a code repository), but policies (e.g., stored with the Fyde cloud) require any device connecting to the resource to have whole disk encryption enabled. Alice's tablet does not have whole disk encryption turned on. When she attempts to connect to the resource (via the appropriate proxy) she will be able to present a valid client certificate. However, her access to the resource will ultimately be denied by the Fyde cloud (via the policy enforcement module). In various embodiments, when a policy enforcement check fails, the device is provided with a notification that the check failed. The reason(s) for the failure can be determined, e.g., by the remediation contacting the Fyde cloud and presenting a unique attempt identifier randomly assigned by the policy enforcer and provided to the Fyde cloud at the time the attempt is made.

One approach to providing such remediation is as follows. When the Fyde proxy (via the policy enforcement engine) denies the request by a client device to proxy a connection, the device application will detect that the connection was terminated. It can ask the remediation engine what the cause of the disconnect was. The remediation engine can then contact the Fyde cloud (similarly to how the policy enforcement module previously did) with similar information (e.g., I am device X and I tried to connect resource Y and I got denied). The Cloud will verify the latest policy attempts (e.g., policy evaluations matching the device and resource and find the entry where it got denied (e.g., using the attempt identifier)) and send the reason for the denial back (e.g., "user no longer exists" or "no whole disk encryption"). The remediation engine is configured with a list of resources that it can present to the user depending what was the problem. E.g., "Your phone is out of date. Update your iPhone." Or "you no longer have access to this resource, contact your admin" (where access was revoked). Policies can also have windows attached to them. For example, users can have a two week window to update their devices to the latest version, after which time their ability to access resources is reduced. This can serve as a carrot to encourage users to keep their devices current as they won't be able to access resources until they update.

The Fyde app has multiple triggers through which it will run different security checks. As one example, some characteristics change only in conjunction with a reboot (e.g., OS version updates, addition/removal of whole disk encryption, etc.). Accordingly, a reboot can be used as a trigger by the Fyde app to check information such as device version and report it as an event (e.g., to the ETL). The current OS version of every device can thus be obtained from the ETL and surfaced, e.g., in a dashboard, or when performing policy analysis.

Suppose ACME has a policy that anyone can use a particular messaging app as long as they're using Fyde, but they can only use Gitlab if they're using iOS version 12 or higher. The check will happen when the policy enforcer contacts the policy engine. When the proxy talks to the policy engine, the policy engine will consult the database and determine what the current version registered for the device is.

There are other checks, potentially, that might need to be done in real-time. Examples include which Wi-Fi network the device is connected to or what is the device's current location. Suppose Alice is attempting to connect to a resource that she is only supposed to access from the internal corporate Wi-Fi because that is how ACME confirms whether devices are inside the premises. One approach would be for Alice's device to frequently send its current WiFi settings. However, this could be problematic (e.g., resulting in an excessive number of ETL events). Another approach is for the policy engine to maintain last known state of certain information (e.g., that the last time a message was received, Alice was using LTE, not Wi-Fi) Other examples include course geolocation based on IP address, Wi-Fi network connected to, whether the device is jailbroken, Carrier (e.g., based on IP), is the passcode set, which type of passcode is set (e.g., 4digit PIN vs. alphanumeric vs. pattern), etc. Some of this information is not likely to refresh very often. Other information might, for example, location, for which more frequent sampling might be appropriate. A policy can specify a per-attribute staleness metric (e.g., 30 minutes or more since last event, refresh the state maintained about the device).

Suppose one of the resources Alice wishes to use requires her to be on premise at ACME (e.g., as determined by Wi-Fi connection). The last time her device contacted the Fyde cloud, she was at home, but she has since arrived at work. When she attempts to access the resource at work, her first attempt might fail if state information associated with her phone is stale (i.e., she may still appear to be not-connected to the appropriate Wi-Fi). Her phone will contact the proxy, the proxy will consult the policy enforcement module, and the policy enforcement module will return, in various embodiments, that (due to information from 25 minutes ago), 'lice's request should be denied because she is not on premises.

In various embodiments, when the connection attempt fails, the policy engine on the Fyde proxy will not know the reason her access was denied, it will only report back to the Fyde app on her phone that the connection was dropped. The remediation engine on her phone, however passes the attempt ID that triggered the rejection to the Fyde cloud, to the policy engine. The remediation engine is going to pass the string to the policy engine. The policy engine will determine that a geo-fencing check failed. In various embodiments, for each attribute, a refresh time can be set. If the last information is older than the refresh time then a new one can be requested. In various embodiments, failures due to location/Wi-Fi settings cause the app to refresh the state information and automatically perform one retry without notifying the user (e.g., due to these being commonly changing attributes and so-as to avoid sending unnecessary notifications to the user).

Periodic pings can be set for particular attributes. Also, refreshes can be triggered by device events other than reboots, such as opening an application or changing Wi-Fi connections. Different freshness timeouts can be used for different attributes, e.g., with device version having a much longer timeout than location.

If Alice wants to use her enrolled laptop to access a resource, proxied connections happen in the same way. The functionality described herein as being provided by a VPN extension (e.g. on an iphone) can also be provided by a VPN extension on a laptop (e.g., under MacOS, Windows, etc.). Similarly, Tun/Tap can be used for Linux to create a virtual interface where all the packets sent to a virtual interface are handled by an embodiment of the application. In a laptop scenario, mTLS is still used, and Alice will still direct her laptop to a resource name such as mattermost.acme.local. Alice's laptop includes software (e.g., a Fyde app for MacOS) which provides for DNS resolution, encrypted tunnels, transport security, etc. in the same way. When Alice performs a task on her laptop, such as a git pull to git.acme.local, that domain will resolve to an internal IP address that the tunnel understands, and based on that, the tunnel will tunnel the information. It will create an mTLS tunnel that from the point of view of git is transparent.

A "no VPN extension" embodiment can also be used with laptops. Two functions are performed when proxying—DNS interception, followed by use of an mTLS tunnel. Both aspects can be performed using an extension to the VPN stack (e.g., in the case of mobile devices and/or where such extensions are used on laptops). However, the two functions can also be performed on a laptop without using the VPN stack, by an embodiment of the Fyde app for an appropriate operating system. In particular, a local DNS resolver can be provided, which resolves git.acme to a loopback address. Each resource to be proxied on the device has a different loopback address. So git.acme resolves to 127.0.1.2 and message.acme resolves to 127.0.1.3. The other component is to use a proxy, such as stunnel, which supports mTLS in client certificate check mode and bind to each of the loopbacks. This approach allows for use of both a typical VPN (e.g., to some other resource that does not make use of Fyde infrastucture, such as Alice's university) simultaneously with Acme connections, as the stunnel approach does not make use of VPN infrastructure.

E. Reverse IP Stack

As shown in FIG. 9E, two IP stacks are maintained on Alice's phone, seemingly counterproductively: the kernel network stack and the Fyde stack. Having two stacks allows the Fyde app to inspect all of the device's traffic and then route it to its intended destination (or prevent transmission as applicable). A traditional VPN does not use two stacks but instead makes use of a single tunnel. All packets are sent to a server and the server multiplexes. The server receives data from the destination and sends it back through the tunnel as is. A traditional VPN does not need to build raw packets. Instead, packets are sent to the VPN server and the VPN server injects the packets as-is into the kernel. If the kernel understands the destination, the packets get routed, and if it doesn't, they get dropped.

Returning to the Safari example, during DNS interception, domains are resolved into internal domains and mapping is performed. The TCP sockets are faked so that data can be sent back to Safari. This approach uses a reverse TCP stack—a lightweight IP stack that has been modified it because, on behalf of the kernel, the Fyde app needs to fake being the recipient of the packet and then proxy it.

Figure 18:
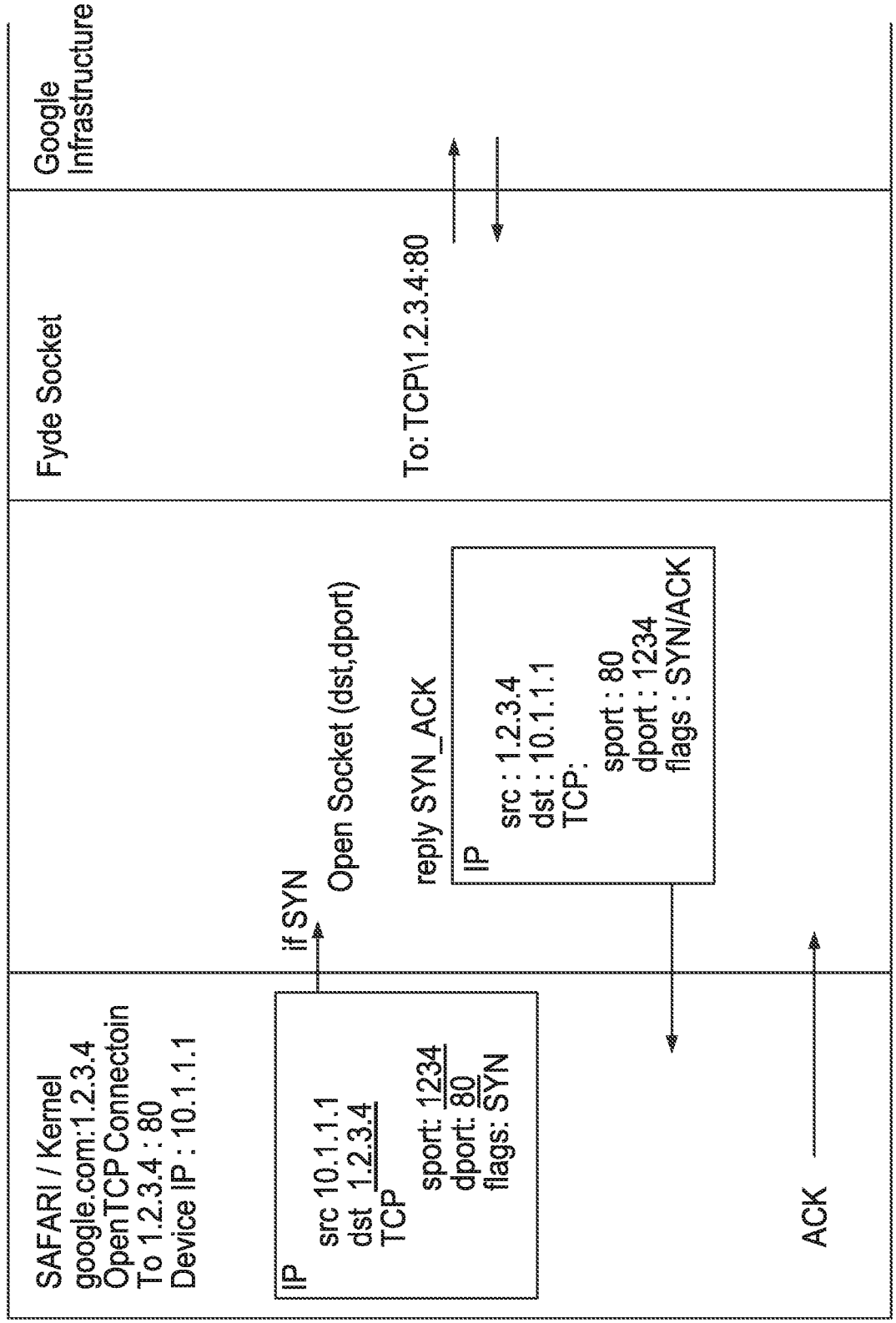
FIG. 18 illustrates use of a reverse TCP stack according to various embodiments.

FIG. 18 illustrates use of a reverse TCP stack according to various embodiments. In the example shown, suppose Alice wants so access www.google.com from the browser on her phone. Safari/the kernel initiate a request (e.g., for www.google.com). Suppose that www.google.com was resolved to 1.2.3.4. (Detail on DNS resolution is omitted from discussion here as it was previously described above, and as UDP is stateless, proxying it involves taking the packet, constructing it again, and sending it. TCP is stateful and proxying it is much more difficult.)

The resolution of www.google.com to 1.2.3.4 is array information. The intent now is to open a TCP connection to 1.2.3.4 in port 80. In order to do so, another piece of information needs to be set: the device IP address (e.g., 10.1.1.1). An IP packet is created where the source is the device's IP, the destination is 1.2.3.4, and the inside of the IP packet contains a TCP packet. The source port is random. Under the destination port is the actual destination which is 80, and also flags are set.

There are three steps of handshake for the TCP connection. There are two columns shown in FIG. 18 for Fyde. One is the incoming and one is the proxy side. There are the Fyde VPN and the Fyde socket as the second part. And, there is a column for Google, which Alice is trying to access—this is the Google infrastructure. (A proxied resource example would behave the same way as a non-proxied resource).

Safari/the kernel create an IP packet and send this to the Fyde VPN. The Fyde VPN receives the packet and determines whether it is a SYN message. If so, it opens a socket to the destination IP and destination port and replies with an acknowledgement. This is a regular socket, as would be created by a regular application (e.g., as Safari does). The Fyde VPN needs to build IP packets and send them back to the application as packets are received from 1.2.3.4. In particular, the source is reversed, in this case the Fyde app fakes itself being 1.2.3.4 replying to the device. For TCP, the source port is 80 and all of the flags are SYN all with ACK.

Once the connection is established, a mapping exists between a fake TCP flow that is being maintained on the Fyde IP stack and a real socket that is actually connecting to the Internet. The socket is a TCP socket going to 1.2.3.4 port 80 and is receiving data from 1.2.3.4—it is a normal connection to Google. Every time data is received, it is sent it to the socket the socket will send it to Google. Whenever Google sends something it will send it to the actual real socket, and the Fyde VPN will synthesize a packet.

If Safari sends a FIN or a reset because it wants to finish the connection, the Fyde VPN will receive it and close the socket which will send a real FIN to Google. Similarly, if Google wants to end the connection it will close the socket. Whenever the socket is closed, it will be detected and synthesized (making a fake FIN packet) and completing the FIN ACK handshake to finish the connection.

VPN extensions tend to be very limited in their available resources (e.g., 15M of RAM available) and so building a lightweight way to handle a reverse stack is challenging. One approach to implementing a reverse TCP stack is to modify an open source off-the-shelf network stack (e.g., for microcontrollers) so that the stack maintains the flow of the TCP stack in reverse, and synthesizes TCP packets.

1. Other Example Uses for Reverse TCP Stack

One use of reverse TCP stack techniques embodiments of which as are described herein is for traffic shaping in any TCP connection desired. As one example, online video services often attempt to determine what resolution of video to send to a client based on connection speed/latency information. Because the TCP packet inflow can be controlled using a reverse TCP stack, delays on receiving them can be faked using the reverse TCP stack. As packets are received from the socket (e.g., opened with an IP known to be (e.g., by the domain list manager) a CDN that serves video), the reverse TCP stack can delay (e.g., 10 milliseconds) before sending a synthetic packet to the video application. Artificial delays will cause the video service to think the connection is of poorer quality than it otherwise would, and automatically reduce the video quality to something more appropriate for the perceived bandwidth. As another example, WebRTC provides a mechanism for detecting/monitoring a stream and asking the sender to downgrade the stream when the quality is poor. Insertion of delay by the reverse TCP stack can be used in traffic shaping as well.

Another use of the reverse TCP stack architecture is to drop TCP packets identified as belonging to domains on a blacklist. For example, when a SYN is received, it can be dropped right away rather than by using an NX as was described above.

Another use of the reverse TCP stack architecture is to tag flows with different metadata clues that can be collected by the Fyde app. For example, an event can be generated with a VoIP call is initiated (and stored via the ETL pipeline) for logging/statistical reasons.

Stated more generally, use of dual TCP stack such as is described herein allows techniques/services historically provided by separate appliances to be brought onto the device. In addition to significantly reducing the complexity/expense of needing to have/maintain such appliances, by brining such services to the device, such services will work both inside and outside the corporate perimeter.

F. Configuring Proxies

In order for a company (e.g., ACME) to make an internal resource (e.g., a messaging platform) available to its users via Fyde infrastructure, a Fyde proxy needs to be created/configured for the resource (e.g., in the Fyde cloud).

Suppose Joe visits ACME's administrative console (or interacts with an API) and supplies information such as a unique name for the proxy. He also provides a publicly accessible hostname or IP address at which the proxy (an edge proxy) can be reached. Typically a hostname (rather than an IP address) will be used for load balancing reasons. Joe also provides a port number, which can be 443 or any arbitrary port number (irrespective of the port number, the proxy will be using mTLS. After selecting a "create" option, Joe receives back an enrollment token for his new proxy. This enrollment step differs from device enrollment performed by a user (e.g., Alice) because device enrollment is interactive process (e.g., Alice interacts with SAME authentication, or needs to open an email and click on a link).

In various embodiments, the proxy token is a secret URL that includes all of the information required for the proxy to enroll with the console, e.g., a magic token. The proxy token is valid as long as the proxy exists on the console. There is no expiration in the link and multiple proxies can be deployed using the same token (e.g., for load balancing). The proxies can be deployed on AWS (or other infrastructure) as a container and replicated as needed and will be configured the same way, and an off-the-shelf load balancer can be placed in front of them.

Joe can deploy the proxy secret in a variety of ways, depending on ACME's chosen infrastructure. One option, for example, is to use Docker secrets. Another option is to use a Hashicorp Vault as a secret manager for containers. AWS Key Management Server and similar secret managers provided by Google and Microsoft can also be used. The secret managers keep the secret and, when spinning up a new virtual machine, deploy it into the VM if applicable (e.g., inserting it somewhere into the file system, or configuring it as an environment variable).

Figure 19:
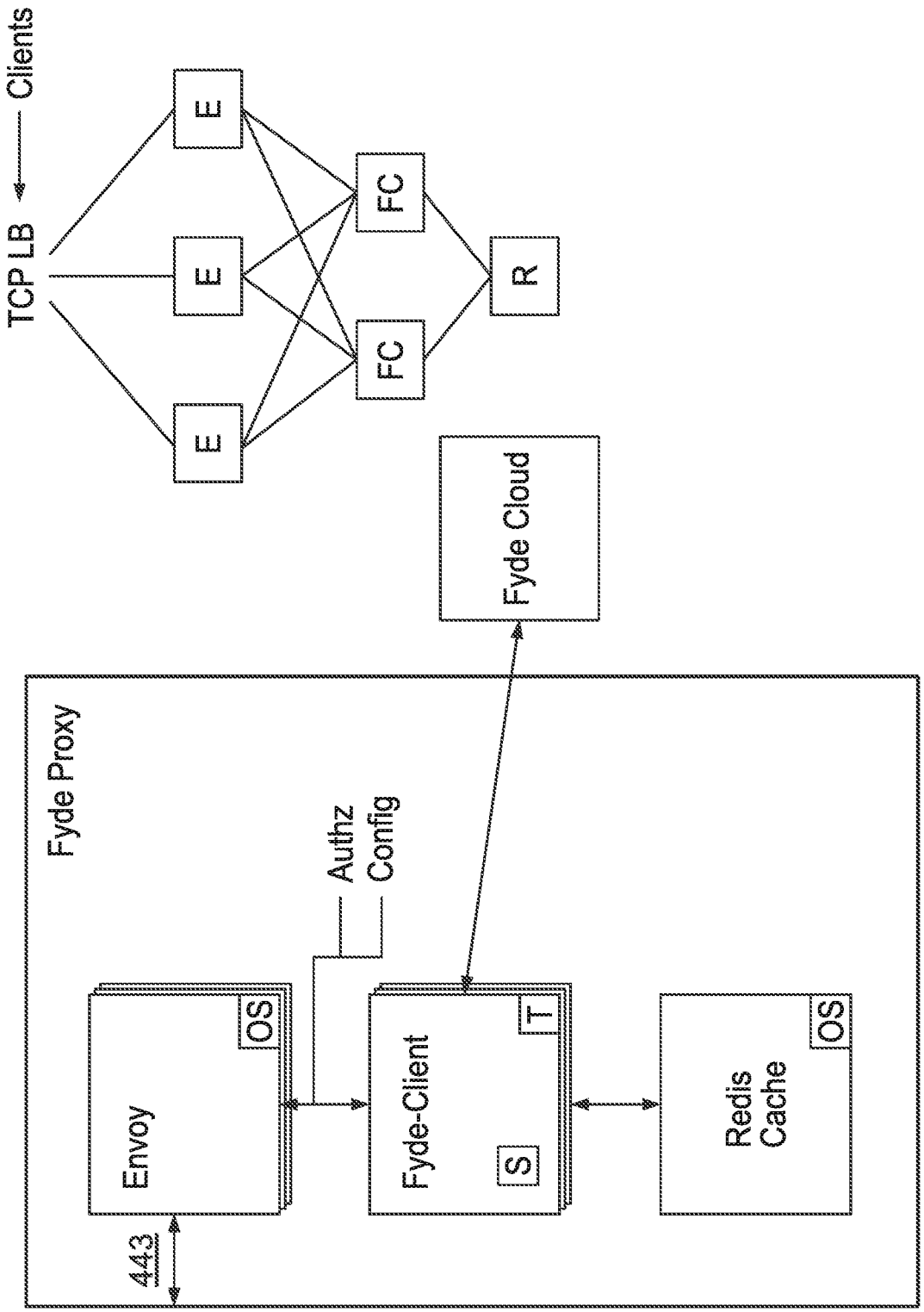
FIG. 19 illustrates an embodiment of an environment that incorporates security techniques described herein.

In addition to configuring the proxy with the Fyde management console, the proxy itself needs to be configured. An example Fyde proxy architecture is depicted in FIG. 19. As shown, the proxy comprises three micro-services/docker containers, that are all linked to each other. There is an Envoy micro-service, a Fyde client (which is the policy enforcer and configurator for Fyde specific things and can be implemented in an appropriate language such as python and made available, e.g., as a package), and a Redis cache. Envoy is used in this example because it includes a mechanism for checking with an external authenticator (e.g., checking with the Fyde client) off-the-shelf. A single Fyde proxy can employ a single one of each of the three depicted components. More robust/elastic configurations can also be deployed, as shown. Similarly, the components can be deployed as three containers on three virtual machines—as three containers on a single virtual machine, etc. Further, logging tools such as syslog and/or sentry can be configured to collect information about Fyde proxies.

The Envoy micro-service is publicly accessible (e.g., listening on port 443), while the Fyde client and Redis cache components need not be. Further, the Redis cache need not be colocated with the Envoy micro-service and Fyde client but can also be external (e.g., as configured by supplying an IP address for the redic cache). As shown in FIG. 19, the Fyde proxy can be implemented using an N cluster setup (e.g., with multiple Envoys and multiple pipelines for high availability). If one of component goes down, the others take over its work.

Between Envoy and the Fyde Client, there are there are two streams of communications. One is the authorization stream, and the other is the configuration stream. The Fyde Client is responsible for receiving the secret and for connecting to the Fyde Cloud. When it connects, it uses the secret to enroll the proxy. The proxy enrollment process uses the secret to authenticate to the Fyde Cloud and identify itself as a particular proxy and send a CSR that identifies itself. The Fyde Cloud verifies everything and sends back a certificate. From that point on, the proxy uses MTLS for all communications with the Fyde Cloud. Proxy enrollment is similar to device enrollment except that the secret doesn't expire and can be reused. FIG. 20 shows a list of configured proxies as rendered in an administrative console.

The Fyde client connects to the Fyde Cloud, and from here the first thing that happens is that the Fyde client asks the Cloud for the configuration stream: the list of resources that the proxy is supposed to proxy. Every time there's a change in the configuration (e.g., a new resource is added), a differential is pushed to the proxy to keep it up to date. So, when a new resource is added (e.g., git), the Fyde Client obtains the configuration and formats it in the particular way that the proxy (e.g., Envoy) needs to receive it, and sends to the proxy so that now it can proxy both IRC and git. To create a resource, Joe accesses the administrative console (or appropriate API) and provides (a) a public name for accessing the resource and applicable ports, (b) the desired hostname and optional port(s) for where he wants a successfully authenticated connection be mapped on the backend. The hostname does not need to resolve, but should be well-formed (e.g., including a dot).

Regarding the second stream (authorization), after verifying the certificates the proxy can ask the Fyde Client if it should allow a connection and the Fyde Client will relay that same information to the Cloud and it will cache the response on the Redis Cache.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor configured to:
  receive, at a proxy server and from a client device, a request to access a protected resource, wherein the protected resource represents a mapping between a user-facing domain and an internal domain that is only accessible from behind a set of one or more proxies that includes the proxy server, wherein the request is received from the client device in response to an interception, by a VPN stack of an operating system executing on the client device, of a DNS resolution request; and in response to receiving a grant of permission by an access policy engine, proxy, by the proxy server, access to the protected resource using a mutual-TLS connection with the client device; and wherein the access policy engine is configured to evaluate a trust level of a device-user, wherein the trust level comprises a named collection of constraints that must be fulfilled to access the resource, wherein evaluating the trust level includes applying a set of rules associated with access to the protected resource to a set of attributes of the client device, and wherein evaluating the trust level includes evaluating historical location data; and a memory coupled to the processor and configured to provide the processor with instructions.

2. The system of claim 1 wherein evaluating the trust level further includes applying the set of rules associated with access to the protected resource to a set of attributes of a user.

3. The system of claim 1 wherein evaluating the trust level includes evaluating telemetric data periodically provided by the client device.

4. The system of claim 1 wherein the grant of permission comprises a token issued to the client device by the access policy engine.

5. The system of claim 1 wherein the grant of permission comprises a message transmitted to the proxy server by the access policy engine.

6. The system of claim 1 wherein the grant of permission has an associated length of time.

7. The system of claim 6 wherein the client device is configured to automatically request an additional grant of permission with an additional length of time prior to a lapsing of the associated length of time.

8. The system of claim 1 wherein the request is received from the client device via a publicly accessible domain.

9. A method, comprising:
receiving, at a proxy server and from a client device, a request to access a protected resource, wherein the protected resource represents a mapping between a user-facing domain and an internal domain that is only accessible from behind a set of one or more proxies that includes the proxy server, wherein the request is received from the client device in response to an interception, by a VPN stack of an operating system executing on the client device, of a DNS resolution request; and in response to receiving a grant of permission by an access policy engine, proxying, by the proxy server, access to the protected resource using a mutual-TLS connection with the client device;

wherein the access policy engine is configured to evaluate a trust level of a device-user, wherein the trust level comprises a named collection of constraints that must be fulfilled to access the resource, wherein evaluating the trust level includes applying a set of rules associated with access to the protected resource to a set of attributes of the client device, and wherein evaluating the trust level includes evaluating historical location data.

10. The method of claim 9 wherein evaluating the trust level further includes applying the set of rules associated with access to the protected resource to a set of attributes of a user.

11. The method of claim 9 wherein evaluating the trust level includes evaluating telemetric data periodically provided by the client device.

12. The method of claim 9 wherein the grant of permission comprises a token issued to the client device by the access policy engine.

13. The method of claim 9 wherein the grant of permission comprises a message transmitted to the proxy server by the access policy engine.

14. The method of claim 9 wherein the grant of permission has an associated length of time.

15. The method of claim 14 wherein the client device is configured to automatically request an additional grant of permission with an additional length of time prior to a lapsing of the associated length of time.

16. The method of claim 9 wherein the request is received from the client device via a publicly accessible domain.

* * * * *